(12) United States Patent
Fujiwara

(10) Patent No.: US 9,516,214 B2
(45) Date of Patent: Dec. 6, 2016

(54) INFORMATION PROCESSING DEVICE AND INFORMATION PROCESSING METHOD

(71) Applicant: Sony Corporation, Minato-ku (JP)

(72) Inventor: Tatsuo Fujiwara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/450,766

(22) Filed: Aug. 4, 2014

(65) Prior Publication Data

US 2015/0077591 A1    Mar. 19, 2015

(30) Foreign Application Priority Data

Sep. 13, 2013  (JP) ................................. 2013-190717

(51) Int. Cl.
*H04N 5/232* (2006.01)
*H04N 5/262* (2006.01)

(52) U.S. Cl.
CPC ...... *H04N 5/23216* (2013.01); *H04N 5/23229* (2013.01); *H04N 5/23293* (2013.01); *H04N 5/2621* (2013.01)

(58) Field of Classification Search
CPC .............................. H04N 9/045; G06T 15/60
USPC ................... 348/222.1, 239; 382/131
See application file for complete search history.

(56) References Cited

U.S. PATENT DOCUMENTS

| | | | | |
|---|---|---|---|---|
| 6,667,741 B1 * | 12/2003 | Kataoka | ................... | G06T 15/50 345/426 |
| 7,242,408 B1 * | 7/2007 | Dunn | ....................... | G06T 15/04 345/426 |
| 8,988,439 B1 * | 3/2015 | Kahn | ........................ | G09G 5/00 345/156 |
| 2008/0231631 A1 * | 9/2008 | Matsumura | ............. | G06T 15/60 345/419 |
| 2010/0321559 A1 * | 12/2010 | Wolfe | ..................... | G03B 15/03 348/371 |
| 2012/0113228 A1 * | 5/2012 | Konno | ............... | H04N 13/0239 348/47 |
| 2012/0188243 A1 * | 7/2012 | Fujii | ....................... | G06T 19/20 345/426 |
| 2012/0200600 A1 * | 8/2012 | Demaine | ................. | A63F 13/10 345/633 |
| 2012/0206452 A1 * | 8/2012 | Geisner | ................ | G02B 27/017 345/419 |
| 2012/0249422 A1 * | 10/2012 | Tse | ......................... | G06F 3/0304 345/158 |
| 2014/0108981 A1 * | 4/2014 | Payzer | .................. | G06F 3/0481 715/767 |

(Continued)

FOREIGN PATENT DOCUMENTS

JP        2000-90233        3/2000

*Primary Examiner* — Roberto Velez
*Assistant Examiner* — Cynthia Segura
(74) *Attorney, Agent, or Firm* — Oblon, McClelland, Maier & Neustadt, L.L.P.

(57) ABSTRACT

There is provided an information processing device including a detection unit configured to detect a motion of the information processing device, a setting unit configured to set a location or orientation of a virtual light source for an image having depth information based on a result of the detection performed by the detection unit, and a display control unit configured to apply an illumination effect to the image based on the location or orientation of the virtual light source set by the setting unit and the depth information.

12 Claims, 20 Drawing Sheets

(56) References Cited

U.S. PATENT DOCUMENTS

| | | | | |
|---|---|---|---|---|
| 2014/0118353 A1* | 5/2014 | Ha | ................ | G06T 19/006 345/426 |
| 2014/0205168 A1* | 7/2014 | Kim | ................ | A61B 8/46 382/131 |
| 2014/0267248 A1* | 9/2014 | Zou | ................ | G06T 15/60 345/420 |
| 2015/0071516 A1* | 3/2015 | Kim | ................ | A61B 8/0866 382/131 |
| 2015/0248776 A1* | 9/2015 | Kasahara | ............ | G06T 11/006 348/222.1 |
| 2015/0281565 A1* | 10/2015 | Nakada | ............ | G06F 3/0481 348/234 |
| 2016/0045823 A1* | 2/2016 | Dalrymple | ........... | A63F 13/213 463/31 |
| 2016/0048988 A1* | 2/2016 | Lee | ................ | G06T 13/80 345/629 |

\* cited by examiner

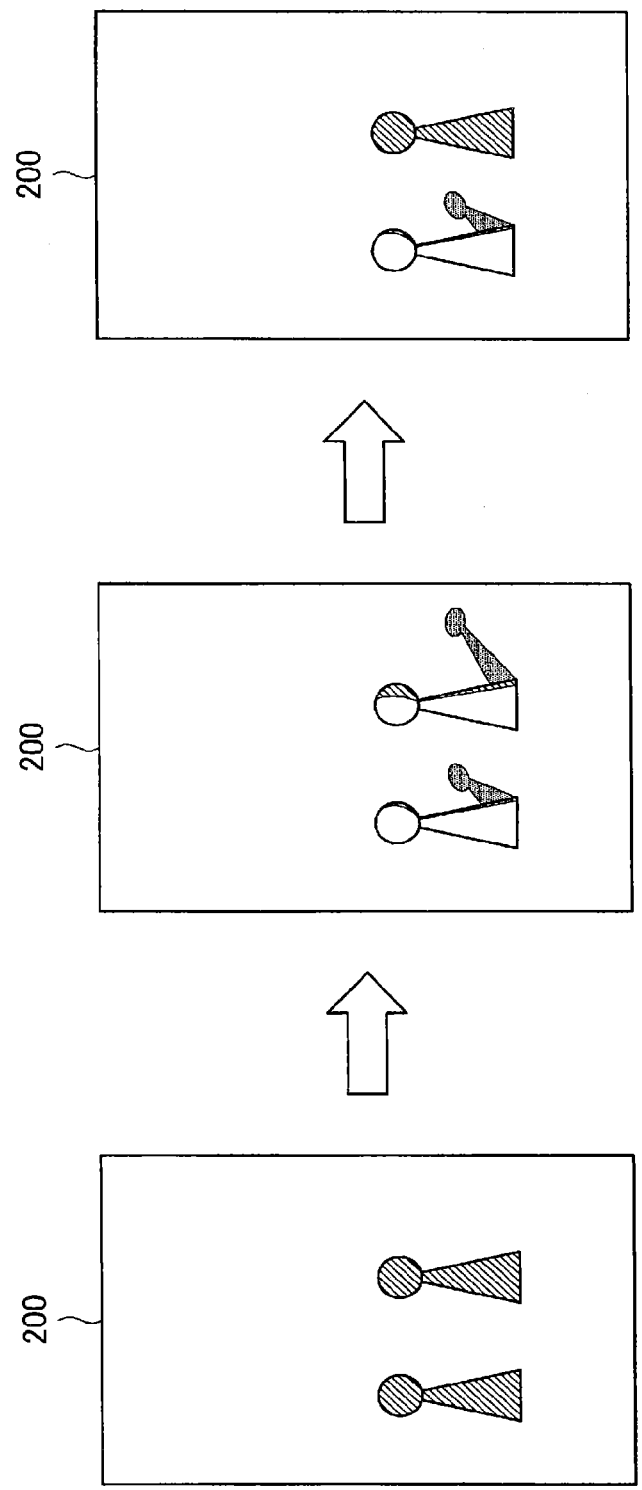

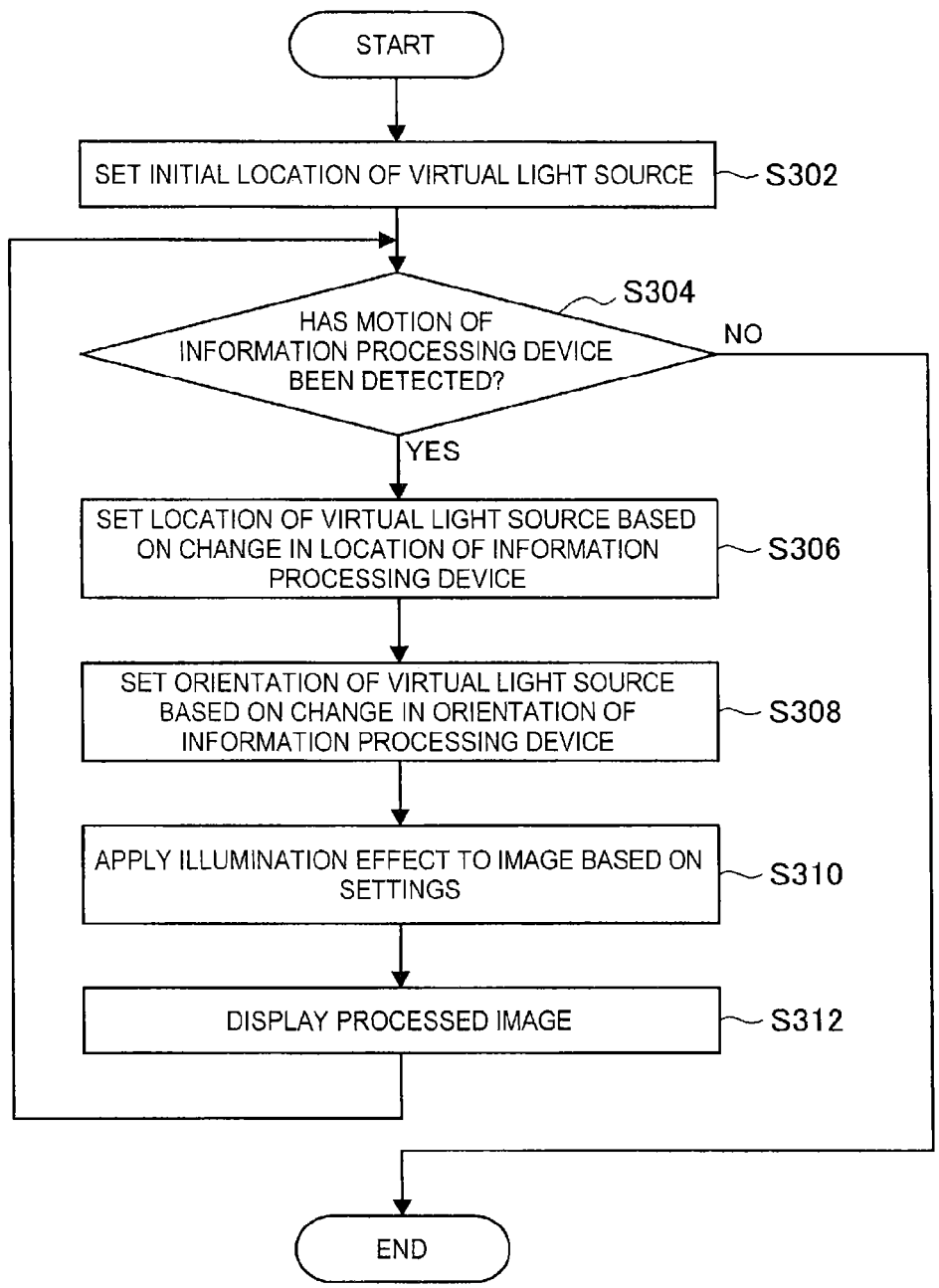

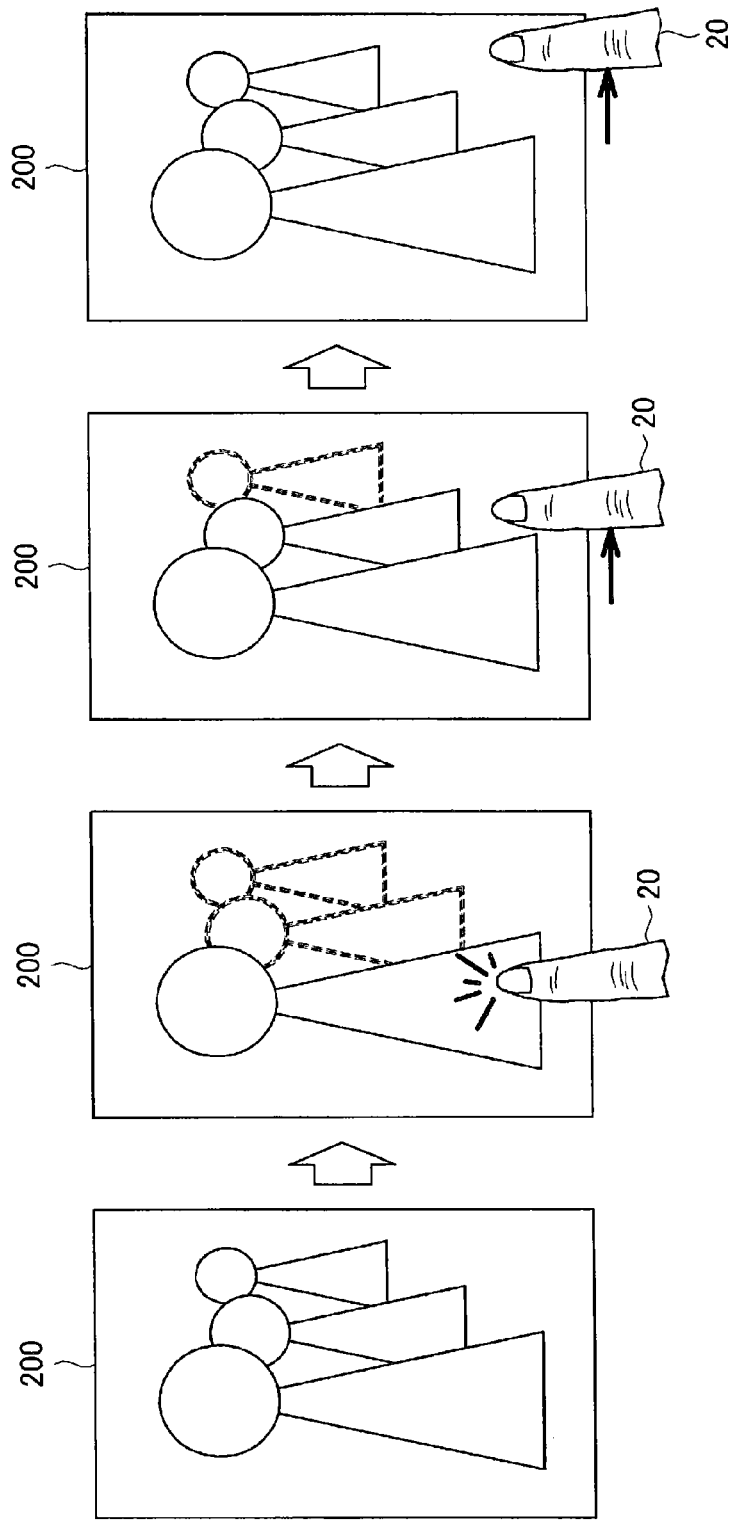

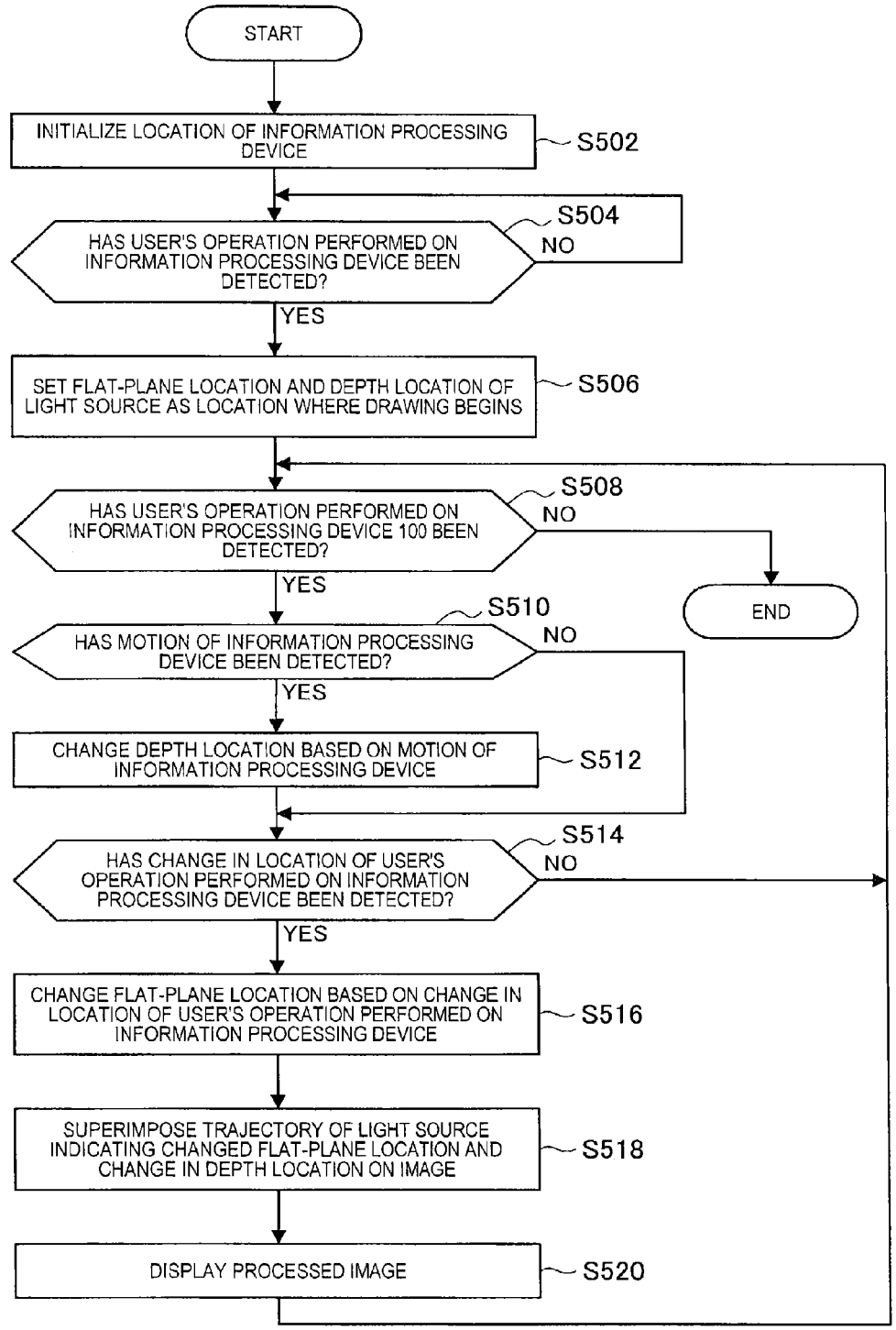

INFORMATION PROCESSING DEVICE AND INFORMATION PROCESSING METHOD

CROSS REFERENCE TO RELATED APPLICATIONS

This application claims the benefit of Japanese Priority Patent Application JP 2013-190717 filed Sep. 13, 2013, the entire contents of which are incorporated herein by reference.

BACKGROUND

The present disclosure relates to information processing devices and information processing methods.

Information devices or applications for three-dimensionally displaying or editing images have in recent years been proposed. In general, three-dimensional displaying or editing of an image means that the image is displayed or edited based on a distribution in the depth direction of the image, a three-dimensional shape of a subject, reflection characteristics of the subject, etc.

For example, JP 2000-90233A describes a technique of providing a light source, capturing images of a subject while illuminating and rotating the subject, and when displaying the images obtained by the capturing, changing the images, depending on the user's operation, so that the light source is located at the desired location.

JP 2000-90233A above also provides an application for extracting a desired portion of an image from the image in accordance with the user's operation, and processing the image portion to create an image which can induce a sense of depth, and a method for performing such extraction.

SUMMARY

However, JP 2000-90233A above does not explicitly describe an operation for changing the location of the light source in an image.

Also, in general, three-dimensional editing of an image requires a lot of complicated operations compared to two-dimensional editing, which does not take account of the depth direction of an image, and as a result, it mostly takes a lot of time and effort to do the editing task.

Therefore, the present disclosure proposes a novel and improved information processing device and information processing method with which three-dimensional editing can be intuitively performed on an image having depth information.

According to an embodiment of the present disclosure, there is provided an information processing device including a detection unit configured to detect a motion of the information processing device, a setting unit configured to set a location or orientation of a virtual light source for an image having depth information based on a result of the detection performed by the detection unit, and a display control unit configured to apply an illumination effect to the image based on the location or orientation of the virtual light source set by the setting unit and the depth information.

Also, according to an embodiment of the present disclosure, an information processing device is provided which includes a setting unit configured to set a portion of a depth of an image having depth information as a portion which is to be in focus, and a display control unit configured to perform a blurring process on the image based on a change in the depth portion to be in focus set by the setting unit.

According to an embodiment of the present disclosure, there is provided an information processing device including a detection unit configured to detect an operation performed on the information processing device and a movement of the information processing device, a setting unit configured to set a flat-plane location based on an operation performed on the information processing device and a depth location based on a movement of the information processing device, for an image having depth information of each flat-plane location, and a display control unit configured to superimpose, onto the image, a trajectory indicating changes in the flat-plane location and the depth location set by the setting unit.

According to an embodiment of the present disclosure, there is provided an information processing device including a detection unit configured to detect a movement of the information processing device which displays an image having depth information, and an image extraction unit configured to extract a portion of the image corresponding to a depth segment which is determined based on the movement of the information processing device.

As described above, according to embodiments of the present disclosure, an information processing device and information processing method are provided with which three-dimensional editing can be intuitively performed on an image having depth information.

Note that the above advantages are not necessarily limiting. In addition to or instead of the above advantages, any of advantages described hereinafter or other advantages that will be understood from the following description, may be achieved.

BRIEF DESCRIPTION OF THE DRAWINGS

FIG. 4A is a diagram showing a change in an image which occurs due to a change in location of a virtual light source in rewriting performed by an information processing device according to an embodiment of the present disclosure.

FIG. 5 is a flowchart showing the concept of a rewriting process performed by an information processing device according to an embodiment of the present disclosure.

FIG. 9 is a diagram for describing example defocusing performed based on a drag operation performed on an information processing device according to an embodiment of the present disclosure.

FIG. 13 is a flowchart showing the concept of a light painting process performed by an information processing device according to an embodiment of the present disclosure.

DETAILED DESCRIPTION OF THE EMBODIMENT(S)

Figure 1:
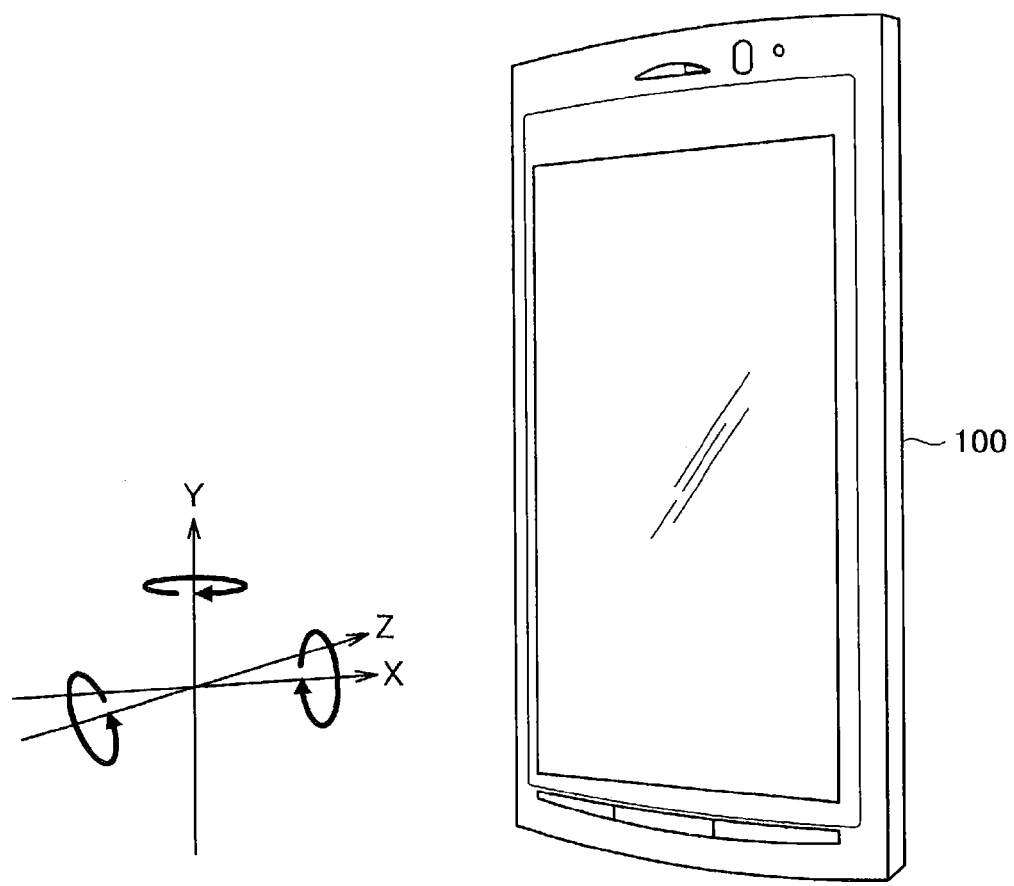
FIG. 1 is a diagram for outlining an information processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Overview of Information Processing Device
2. Configuration of Information Processing Device
3. Rewriting
4. Defocusing
5. Light Painting
6. Segmentation
7. Hardware Configuration
8. Conclusion

1. Overview of Information Processing Device

Firstly, an information processing device according to an embodiment of the present disclosure will be outlined with reference to FIG. 1. FIG. 1 is a diagram for outlining the information processing device of the embodiment of the present disclosure.

The information processing device 100 of FIG. 1 is a portable mobile terminal which is carried by the user, and has a function of detecting a motion of the information processing device 100. Therefore, the information processing device 100 can detect a motion, slant, etc. caused by the user. For example, the information processing device 100 can detect a motion in each of X-, Y-, and Z-axis directions shown in FIG. 1 or a rotation about each of X, Y, and Z axes. Here, the Y-axis direction may be the vertical direction of the information processing device 100 as the information processing device 100 is in a reference position. The Z-axis direction is the depth direction of the information processing device 100 as the information processing device 100 is in the reference position. The X-axis direction may be the direction perpendicular to both of the Y axis and the Z axis. The information processing device 100 also sets a state thereof which occurs immediately before various image editing processes described below as the reference position of the information processing device 100 before performing the processes. Note that the reference position of the information processing device 100 may, for example, be an upright position of the information processing device 100.

The information processing device 100 also displays an image having depth information indicating a relative distance to a subject in the depth direction, and performs three-dimensional editing on the image. For example, the information processing device 100 displays an image on a built-in touchscreen, and edits the image based on an input operation through the touchscreen etc. and the depth information of the image.

Here, in general, three-dimensional editing of an image requires a lot of complicated parameter setting operations compared to two-dimensional editing, which does not take account of the depth direction of an image, and as a result, it mostly takes a lot of time and effort to do the editing task. Therefore, the information processing device 100 sets parameters for three-dimensional editing of an image having depth information based on a motion of or an operation performed on the information processing device 100. For example, when the user moves the information processing device 100 in the Z-axis direction of FIG. 1 while operating the information processing device 100 on the X-Y plane, an image may be edited, taking the depth direction of the image into account.

Thus, the information processing device 100 sets parameters for three-dimensional editing of an image based on a motion of or an operation performed on the information processing device 100. Therefore, the user can intuitively set parameters for three-dimensional editing of an image, whereby the task of three-dimensionally editing an image can be simplified. Although, in FIG. 1, a smartphone is shown as an example of the information processing device 100, the information processing device 100 may be a mobile terminal, such as a tablet terminal, handheld game console, etc.

2. Configuration of Information Processing Device

In the foregoing, the information processing device 100 of the embodiment of the present disclosure has been outlined.

Figure 2:
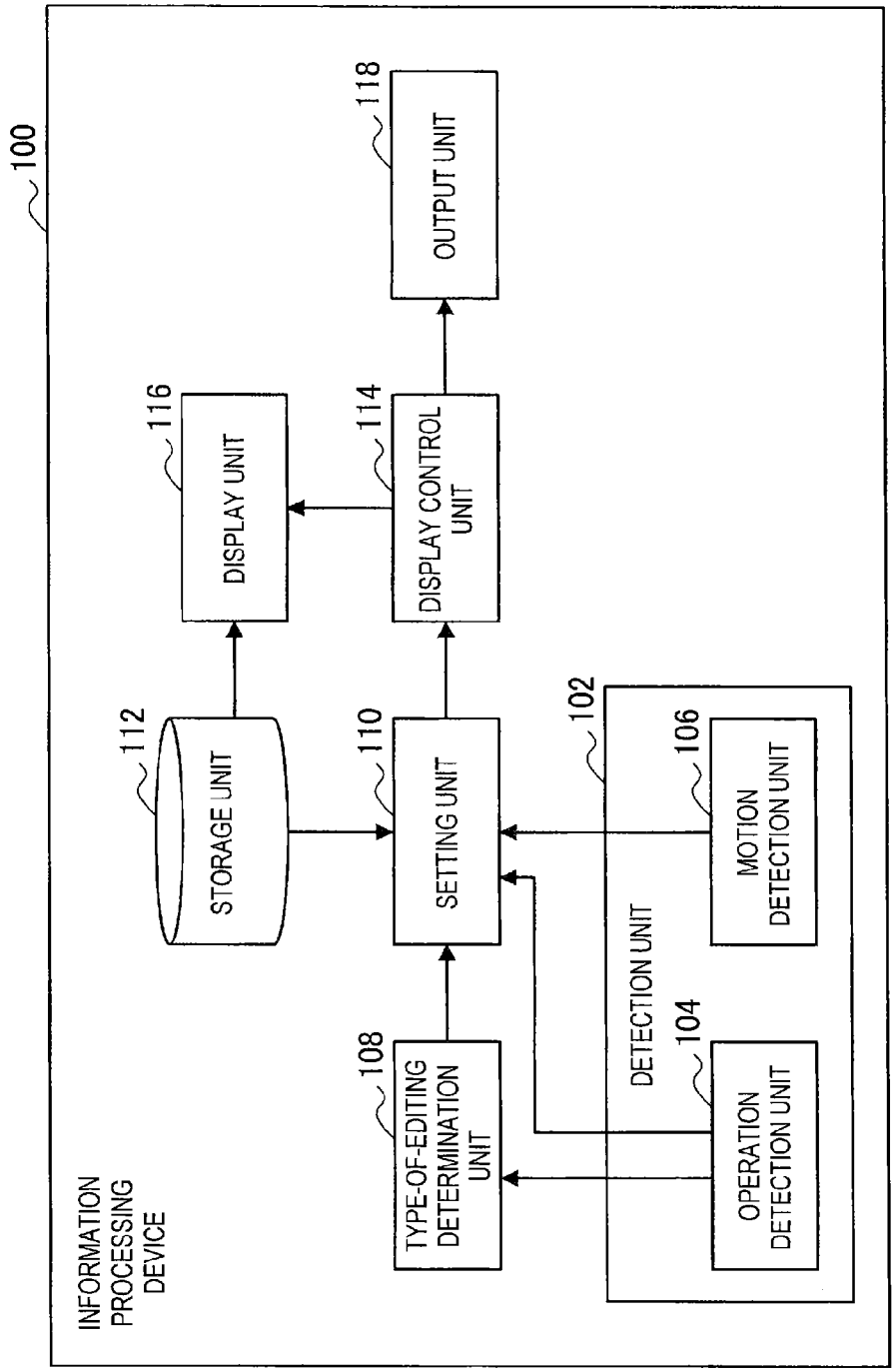
FIG. 2 is a block diagram schematically showing a functional configuration of an information processing device according to an embodiment of the present disclosure.

Next, a configuration of the information processing device of this embodiment will be described with reference to FIG. 2. FIG. 2 is a block diagram schematically showing a functional configuration of the information processing device 100 of the embodiment of the present disclosure.

Referring to FIG. 2, the information processing device 100 includes a detection unit 102, a type-of-editing determination unit 108, a setting unit 110, a storage unit 112, a display control unit 114, a display unit 116, and an output unit 118.

The detection unit 102 includes an operation detection unit 104 and a motion detection unit 106 in order to detect a state of the information processing device 100.

The operation detection unit 104 detects the user's operation performed on the information processing device 100. For example, the operation detection unit 104 may be a touch sensor etc. which detects a touch operation performed on the touchscreen. The operation detection unit 104 also notifies the type-of-editing determination unit 108 and the setting unit 110 described below of the result of the detection.

The motion detection unit 106 detects a motion of the information processing device 100. For example, the motion detection unit 106 may include an acceleration sensor and angular velocity sensor (gyroscope) which detect a change in location or orientation of the information processing device 100, or a geomagnetic sensor etc. instead of the angular velocity sensor. The motion detection unit 106 also notifies the setting unit 110 of the result of the detection.

The type-of-editing determination unit 108 determines what type of image editing has been selected by the user. Specifically, the type-of-editing determination unit 108 determines what type of editing has been selected, based on an operation detected by the operation detection unit 104. The type of editing in this embodiment may be any of rewriting, defocusing, light painting, or segmentation. The types of editing will be described in detail below.

The setting unit 110 reads an image and the depth information of the image from the storage unit 112, and sets parameters for image editing corresponding to the selected type of editing based on the detection result obtained from the detection unit 102. Specifically, based on the detection result received from the operation detection unit 104 or the motion detection unit 106, the setting unit 110 sets parameters for image editing corresponding to the type of editing determined by the type-of-editing determination unit 108. Note that the depth information of an image which has been read out is optionally used. Different parameters are set for different types of editing, and therefore, will be described in detail below.

The storage unit 112 stores an image to be edited and the depth information of the image.

The display control unit 114 generates an image which is to be displayed on the display unit 116. Specifically, the display control unit 114 performs a process corresponding to the selected type of editing on an image based on parameters for the image editing set by the setting unit 110 and the depth information of the image read from the storage unit 112.

The display unit 116 displays an unprocessed image read from the storage unit 112 or an image processed by the display control unit 114. For example, the display unit 116 may be a touchscreen etc.

The output unit 118 outputs an image processed by the display control unit 114. For example, the output unit 118 may output the processed image from the information processing device 100 through a communication device etc. Note that the output unit 118 may output an image processed by the display control unit 114 in a moving image format. The output unit 118 may also output parameters set by the setting unit 110. When the output unit 118 outputs the parameters, the information processing device 100 deals with the output parameters, the image, and the depth information together. For example, the information processing device 100 may provide the set of the output parameters, the image, and the depth information to a device etc. external to the information processing device 100. As a result, compared to when the image is provided in a moving image format, the amount of data can be reduced, and the provision destination can change the settings of the parameters. For example, by allowing the provision destination to change the settings of the parameters, the setting of the quality of a rendered image can be adjusted based on the configuration and processing performance of the provision destination.

In the foregoing, the configuration of the information processing device 100 of the embodiment of the present disclosure has been described. The types of editing (rewriting, defocusing, light painting, and segmentation) of the information processing device 100 will now be separately described in detail.

3. Rewriting

3-1. Background

Electronic devices or applications which change the conditions of illumination in an image obtained by image capture after the image capture have in recent years been proposed.

However, in general, three-dimensional editing of the conditions of illumination in an image requires a lot of complicated operations compared to two-dimensional editing, which does not take account of the depth direction of an image, and as a result, it mostly takes a lot of time and effort to do the editing task.

Therefore, an information processing device and information processing method with which an illumination effect can be intuitively applied to an image having depth information will now be proposed.

3-2. Overview of Rewriting

Firstly, rewriting performed by the information processing device 100 of the embodiment of the present disclosure will be outlined.

Rewriting performed by the information processing device 100 refers to additionally applying an illumination effect to an image having depth information based on a motion of the information processing device 100. Specifically, in the rewriting, a virtual light source is set for an image having depth information, based on a change in location of the information processing device 100 in each of the X-, Y-, and Z-axis directions of FIG. 1 or a change in angle of rotation of the information processing device 100 about each of the X, Y, and Z axes of FIG. 1. After the location or orientation of the virtual light source has been determined, a region to be illuminated and a region to be shaded are identified based on an anteroposterior relation of subjects obtained from the depth information and the location or orientation of the set virtual light source. The image is rewritten, taking into account the region to be illuminated and the region to be shaded.

Thus, in the rewriting performed by the information processing device 100, the location or orientation of the virtual light source is set based on a motion of the information processing device 100 to apply an illumination effect to an image.

3-3. Details of Rewriting

Next, an operation of each function of the information processing device 100 which implements the above rewriting process will be described.

The rewriting process is implemented by operations of the motion detection unit 106, the setting unit 110, the display control unit 114, and the display unit 116.

The motion detection unit 106 detects a motion of the information processing device 100. Specifically, the motion detection unit 106 detects a change in location or orientation of the information processing device 100. The motion detection unit 106 notifies the setting unit 110 of the result of the detection.

The setting unit 110 sets the location or orientation of the virtual light source based on the detection result of the motion detection unit 106. Specifically, the setting unit 110 calculates the amount of a change in location or the amount of a change in orientation based on the location or orientation change obtained from the motion detection unit 106. Thereafter, the setting unit 110 changes the setting of the location or orientation of the virtual light source based on the immediately previous location or orientation of the virtual light source and the calculated amount of a change in location or the calculated amount of a change in orientation.

The display control unit 114 applies an illumination effect to an image based on the location or orientation of the virtual light source set by the setting unit 110 and the depth information of the image. Specifically, the display control unit 114 identifies a region to be illuminated and a region to be shaded based on an anteroposterior relation of subjects obtained from the depth information and the location or orientation of the set virtual light source, and reflects such identification on the image. Note that a distance between the location of the virtual light source and the location in the depth direction of each portion of the image may be calculated, and based on the calculated distance, the intensity of light for the region to be illuminated may be adjusted. The display control unit 114 may also emphasize or change texture. For example, the display control unit 114 may estimate or specify reflection characteristics of each of regions of subjects, thereby adding various reflection effects, such as specular reflection, diffuse reflection, etc., to the image.

The display unit 116 displays an image to which an illumination effect has been applied by the display control unit 114.

Figure 3A:
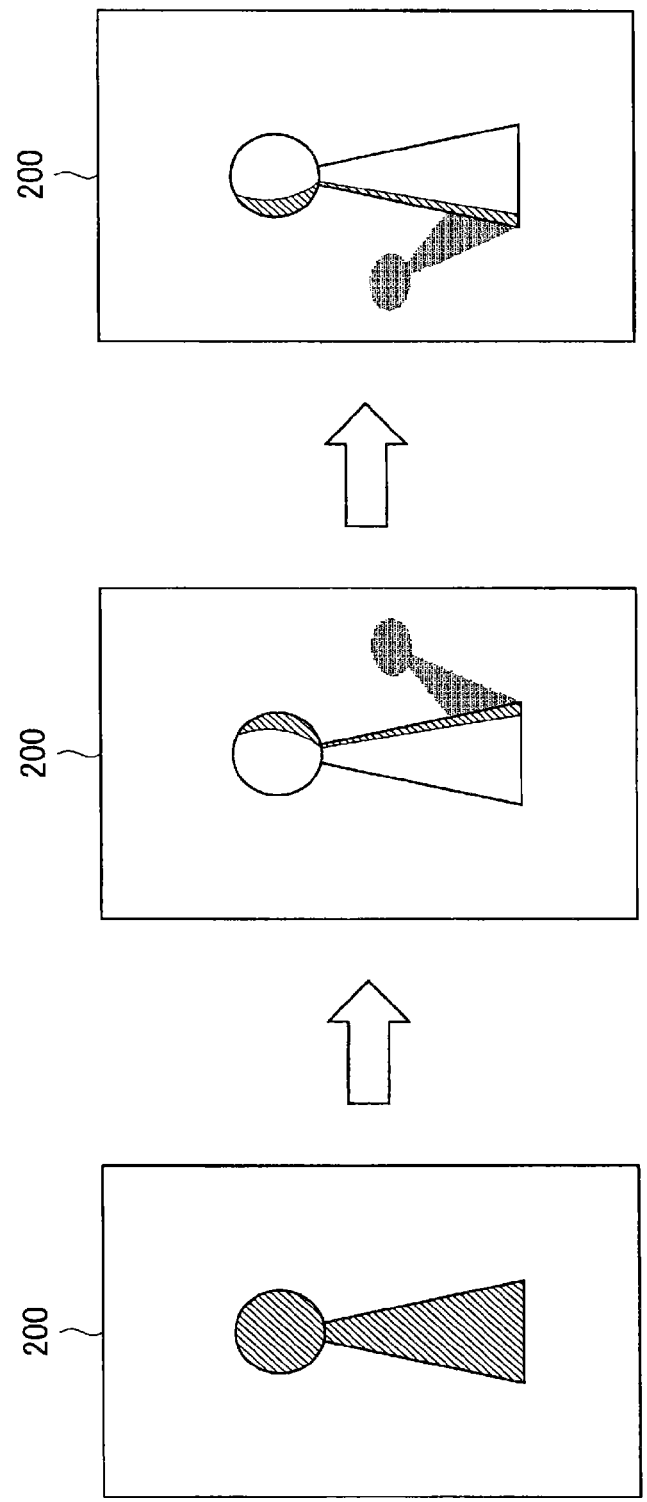
FIG. 3A is a diagram showing a change in an image which occurs due to a change in location of a virtual light source in rewriting performed by an information processing device according to an embodiment of the present disclosure.
Figure 3B:
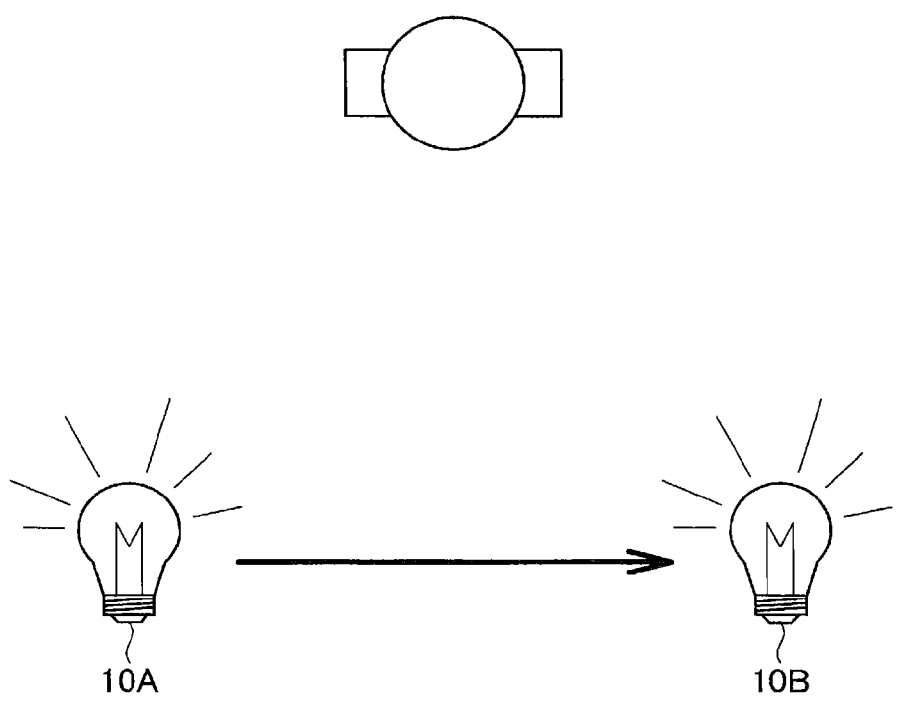
FIG. 3B is a conceptual diagram showing a change in location of a virtual light source in rewriting performed by an information processing device according to an embodiment of the present disclosure.

Next, the rewriting will be specifically described with reference to FIGS. 3A and 3B. FIG. 3A is a diagram showing a change in an image which occurs due to a change in location of the virtual light source in the rewriting performed by the information processing device 100 of the embodiment of the present disclosure. FIG. 3B is a conceptual diagram showing a change in location of the virtual light source in the rewriting performed by the information processing device 100 of the embodiment of the present disclosure, i.e., a change in location of the virtual light source with an subject in an image being viewed from above.

The left figure of FIG. 3A shows an image 200 in which a person has been captured as a subject. An example in which an illumination effect applied to the image 200 varies depending on the user's operation performed on the information processing device 100 and a change in location of the information processing device 100, will now be described.

Initially, when the user selects the rewriting as a type of editing, as shown in FIG. 3B the setting unit 110 sets the virtual light source at a predetermined initial location 10A, and the display control unit 114 applies an illumination effect to an image based on the location of the set virtual light source. As a result, at the beginning of the rewriting, the virtual light source at the initial location 10A is used to apply an illumination effect to the image 200, so that, as shown in the middle figure of FIG. 3A, the person in the image 200 is illuminated, and the shadow of the person is displayed.

Next, when the user moves the information processing device 100 rightward with respect to the image 200, i.e., in the positive direction of the X axis of FIG. 1, the motion detection unit 106 detects a change in location of the information processing device 100. Next, the setting unit 110 calculates the amount of a change in location based on the location change detected by the motion detection unit 106, and sets the location of the virtual light source to a location 10B based on the immediately previous location and the calculated amount of a change in location. Thereafter, the display control unit 114 applies an illumination effect to the image based on the location of the virtual light source set by the setting unit 110 and the depth information of the image. Here, if the direction of the location change of the virtual light source is set to be the same as the direction of the location change of the information processing device 100, the virtual light source is moved to the location 10B on a right side with respect to the image 200 in response to the movement of the information processing device 100 in the positive direction of the X axis. Thereafter, an illumination effect is applied to the image 200 by the virtual light source at the location 10B, so that, as shown in the right figure of FIG. 3A, the way the image 200 is illuminated, the direction of the shadow, etc. are changed.

Figure 4B:
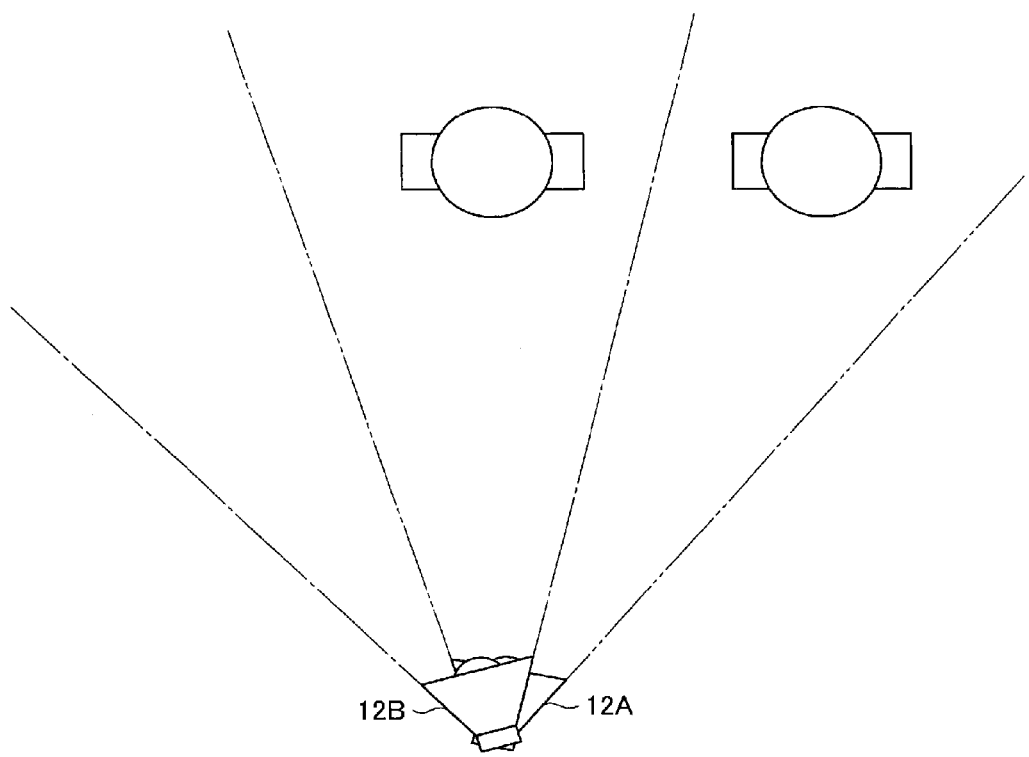
FIG. 4B is a conceptual diagram showing a change in location of a virtual light source in rewriting performed by an information processing device according to an embodiment of the present disclosure.

Also, another example of the rewriting will be described with reference to FIGS. 4A and 4B. FIG. 4A is a diagram showing a change in an image which occurs due to a change in orientation of the virtual light source in the rewriting performed by the information processing device 100 of the embodiment of the present disclosure. FIG. 4B is a conceptual diagram showing a change in orientation of the virtual light source in the rewriting performed by the information processing device 100 of the embodiment of the present disclosure, i.e., a change in orientation of the virtual light source with subjects of an image being viewed from above.

The left figure of FIG. 4A shows an image 200 in which two persons have been captured as subjects. An example in which an illumination effect applied to the image 200 varies depending on the user's operation performed on the information processing device 100 and a change in orientation of the information processing device 100, will now be described.

Initially, when the user selects the rewriting as a type of editing, as shown in FIG. 4B the setting unit 110 sets the virtual light source to have a predetermined initial orientation 12A, and the display control unit 114 applies an illumination effect to the image based on the orientation of the set virtual light source. As a result, an illumination effect is applied to the image 200 by the virtual light source having the initial orientation 12A, so that, as shown in the middle figure of FIG. 4A, the two persons in the image 200 are both illuminated, and their shadows are displayed.

Next, when the user slants the information processing device 100 in a right rear direction toward the image 200, i.e., the information processing device 100 is slanted counterclockwise about the Y axis of FIG. 1, the motion detection unit 106 detects a change in orientation of the information processing device 100. Next, the setting unit 110 calculates the amount of a change in orientation based on the orientation change detected by the motion detection unit 106, and sets the orientation of the virtual light source to an orientation 12B based on the immediately previous orientation and the calculated amount of a change in orientation. Thereafter, the display control unit 114 applies an illumination effect to the image based on the orientation of the virtual light source set by the setting unit 110 and the depth information of the image. Here, if the direction of the orientation change of the virtual light source is set to be the same as the direction of the orientation change of the information processing device 100, the orientation of the virtual light source is changed from the orientation 12A to the orientation 12B based on the counterclockwise slant about the Y axis of the information processing device 100. Thereafter, an illumination effect is applied to the image 200 by the virtual light source having the orientation 12B, so that, as shown in the right figure of FIG. 4A, the way the right person in the image 200 is illuminated and the shadow of the right person are not changed, and the left person in the image 200 is out of the illumination range of the light source and therefore is not illuminated, and the shadow of the left person in the image 200 is not displayed.

3-4. Rewriting Process

Next, the rewriting process performed by the information processing device 100 of the embodiment of the present disclosure will be described with reference to FIG. 5. FIG. 5 is a flowchart showing the concept of the rewriting process performed by the information processing device 100 of the embodiment of the present disclosure.

Initially, the setting unit 110 sets the initial location of the virtual light source (step S302). For example, the initial location may be a predetermined location.

Next, the setting unit 110 determines whether or not a motion of the information processing device 100 has been detected (step S304). Specifically, the setting unit 110 performs the determination based on the result of the detection performed by the motion detection unit 106.

If, in step S304, it is determined that a motion of the information processing device 100 has been detected, the setting unit 110 sets the location of the virtual light source based on a change in location of the information processing device 100 (step S306). Specifically, the setting unit 110 calculates the amount of a change in location based on the location change obtained from the motion detection unit 106, and changes the setting of the location based on the immediately previous location and the calculated amount of a change in location.

Next, the setting unit 110 sets the orientation of the virtual light source based on a change in orientation of the information processing device 100 (step S308). Specifically, the setting unit 110 calculates the amount of a change in orientation based on the orientation change obtained from the motion detection unit 106, and changes the setting of the orientation based on the immediately previous orientation and the calculated amount of a change in orientation.

Next, the display control unit 114 applies an illumination effect to the image based on the settings changed by the setting unit 110 (step S310). Specifically, the display control unit 114 applies an illumination effect to the image based on the location or orientation of the virtual light source set by the setting unit 110 and the depth information of the image.

Next, the display unit 116 displays the image to which the display control unit 114 has applied the illumination effect (step S312).

Thus, in the rewriting performed by the information processing device 100, the location or orientation of the virtual light source is set based on the location or orientation of the information processing device 100, and based on the setting, an illumination effect is applied to the image 200 having depth information. Therefore, by setting parameters of the image 200 based on the location or orientation of the information processing device 100, the user can intuitively apply an illumination effect to the image 200.

3-5. Example Setting of Virtual Light Source

Figure 6:
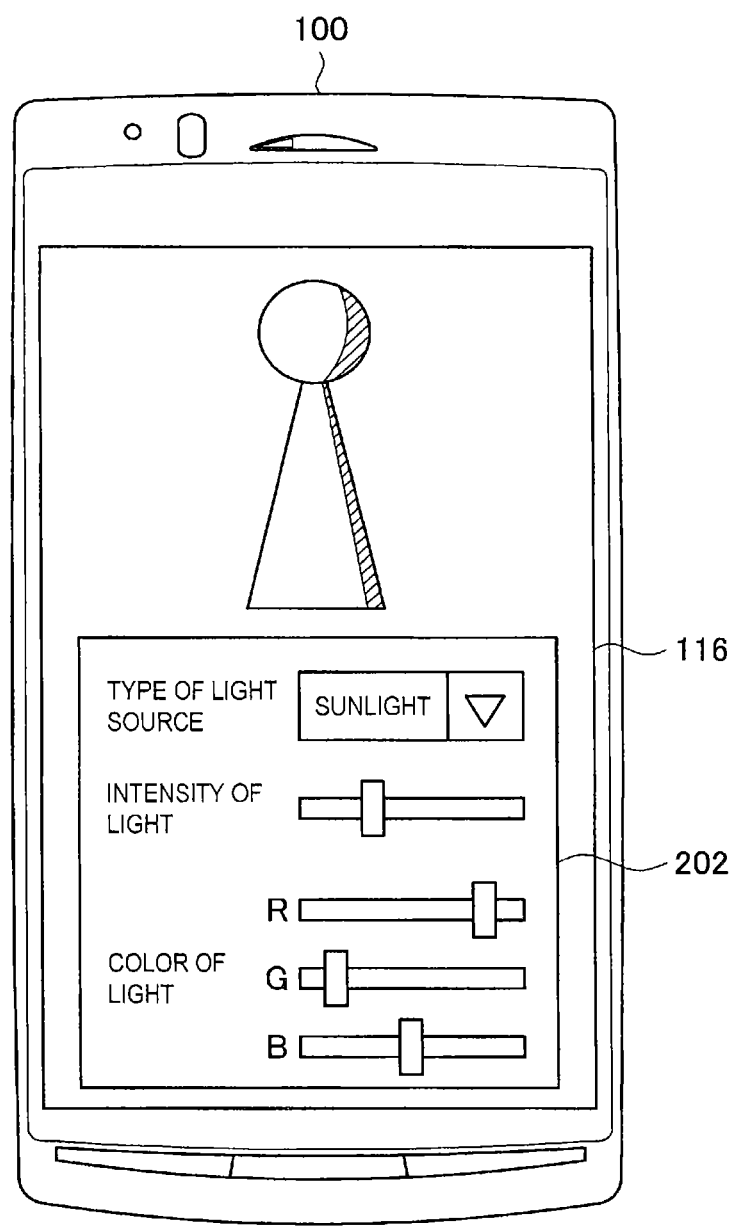
FIG. 6 is a diagram for describing the setting of an attribute of a virtual light source in rewriting performed by an information processing device according to an embodiment of the present disclosure.

In the rewriting performed by the information processing device 100 of this embodiment, an attribute of the virtual light source may be set. Specifically, the setting unit 110 sets the attribute of the virtual light source based on the result of an operation detected by the operation detection unit 104, and based on the setting, the display control unit 114 applies an illumination effect. For example, the attribute of the virtual light source may be the type of the light source, the intensity of light, the color of light, etc. A more specific description will be given with reference to FIG. 6. FIG. 6 is a diagram for describing the setting of the attribute of the virtual light source in the rewriting performed by the information processing device 100 of the embodiment of the present disclosure.

Referring to FIG. 6, an image displayed by the display unit 116 of the information processing device 100 includes a setting screen 202 showing attributes of the virtual light source. The attributes of the virtual light source may be selected on the setting screen 202.

The type of the light source may be selected from options. For example, the type of the light source may be sunlight, a fluorescent lamp, a spotlight, etc., and may be selected from a pull-down menu. The intensity of light may be selected in a stepwise fashion. The color of light may, for example, be represented by RGB. Each of R, G, and B may be selected in a stepwise fashion.

Note that the setting screen 202 for setting the attributes of the virtual light source is merely exemplary. Alternatively, in the information processing device 100, an attribute of the virtual light source may be set by a touch operation, button operation, etc. instead of displaying the setting screen.

Thus, in the information processing device 100, the display control unit 114 applies an illumination effect to an image based on the settings of the attributes of the virtual light source selected using the setting screen 202, and the display unit 116 displays the image to which the illumination effect has been applied. Therefore, by setting the attributes of the virtual light source in accordance with the user's operation performed on the information processing device 100, the attributes of the virtual light source can be set simultaneously with changing of the location or orientation of the virtual light source.

3-6. Example Change Over Time of Setting of Virtual Light Source

In the rewriting performed by the information processing device 100 of this embodiment, an illumination effect applied to an image may be changed over time. Specifically, the setting unit 110 changes the setting of the virtual light source over time, and the display control unit 114 changes an illumination effect to be applied, in accordance with the setting change of the virtual light source. More specifically, the setting unit 110 stores, in the storage unit 112, the setting of the virtual light source which has been obtained based on the detection result of the operation detection unit 104 or the motion detection unit 106, and subsequently, reads the setting stored in the storage unit 112, and sequentially applies the setting. Thereafter, the display control unit 114 applies an illumination effect to an image in accordance with the setting changed by the setting unit 110.

Thus, the information processing device 100 stores the setting of the virtual light source, reads and applies the stored setting sequentially in time, and applies an illumination effect based on the applied setting. Therefore, the stored setting of the virtual light source is read and applied sequentially in time, whereby a moving image for which an illumination effect applied to an image is changed over time can be generated.

4. Defocusing

4-1. Background

Electronic devices or applications which change the in-focus location in an image obtained by image capture after the image capture have in recent years been proposed.

However, in general, it is difficult to change the in-focus location of an image over time.

Therefore, an information processing device and information processing method which can change the in-focus location of an image over time will now be proposed.

4-2. Overview of Defocusing

Firstly, defocusing performed by the information processing device 100 of the embodiment of the present disclosure will be outlined.

In general, defocusing refers to adaptively blurring an image by moving the image capture plane from the imaging plane of a lens in the optical axis direction in order to provide various bokeh effects which are caused by a shooting condition in which a depth of field is small, vertical shift (rise) effect, etc. during shooting. In this embodiment, defocusing refers to changing a blurring effect additionally applied to an image having depth information over time in order to reproduce the above various blur effects. Specifically, in the defocusing, information about a change over time of a depth portion which is to be in focus in an image is stored in the storage unit, and based on the stored information, a portion of the image to which the blurring process is applied is changed over time.

A depth portion to be set may be specified by the user's operation. Specifically, the information processing device 100 detects the user's operation performed on the information processing device 100 or a motion of the information processing device 100, and based on the result of the detection, stores information about a change over time of a depth portion which is to be in focus in an image. Thereafter, the information processing device 100 sequentially reads the stored information, sets a depth portion which is to be in focus, and causes a portion of the image having a depth included in the set depth portion to be in focus. For example, the display unit 116 is a touchscreen, an image is displayed on the touchscreen, and the user performs a touch operation to specify a location on which the user desires to focus in an image. The touch operation is detected by the operation detection unit 104, and the setting unit 110 identifies the location in the image based on the result of the detection performed by the operation detection unit 104, and stores a depth portion having a depth at the location in the image as a portion which is to be in focus, in a time-series fashion. The setting unit 110 sequentially reads and sets the stored depth portions as portions which are to be in focus, and the display control unit 114 causes portions of the image having depths included in the set depth portions to be in focus.

Thus, in the defocusing performed by the information processing device 100, the user's operation performed on the information processing device 100 is detected, and based on the result of the detection, information about a change over time of a depth portion which is to be in focus is stored, and the stored information is sequentially read out to set depth portions which are to be in focus, and portions of the images are caused to be in focus based on the portions of the image which have depths included in the set depth portions.

4-3. Details of Defocusing

Next, an operation of each function of the information processing device 100 for implementing the above defocusing process will be described.

The defocusing process is implemented by operations of the operation detection unit 104, the setting unit 110, the storage unit 112, the display control unit 114, and the display unit 116.

The operation detection unit 104 detects the user's operation performed on the information processing device 100. For example, the operation detection unit 104 detects the user's touch operation performed on the touchscreen. The operation detection unit 104 notifies the setting unit 110 of the result of the detection.

Based on the detection result of the operation detection unit 104, the setting unit 110 calculates a depth portion which is to be in focus, and stores the calculated depth portion into the storage unit 112. Specifically, the setting unit 110 calculates a depth portion including a depth possessed by a location in an image corresponding to the touch location detected by the operation detection unit 104, and stores the calculated depth portion into the storage unit 112.

The storage unit 112 stores the depth portion calculated by the setting unit 110.

The display control unit 114 causes a portion of the image to be in focus based on the depth portion set by the setting unit 110. Specifically, the display control unit 114 causes a portion of the image set by the setting unit 110 to be in focus, and blurs the other portion of the image.

The display unit 116 displays the image processed by the display control unit 114.

Figure 7:
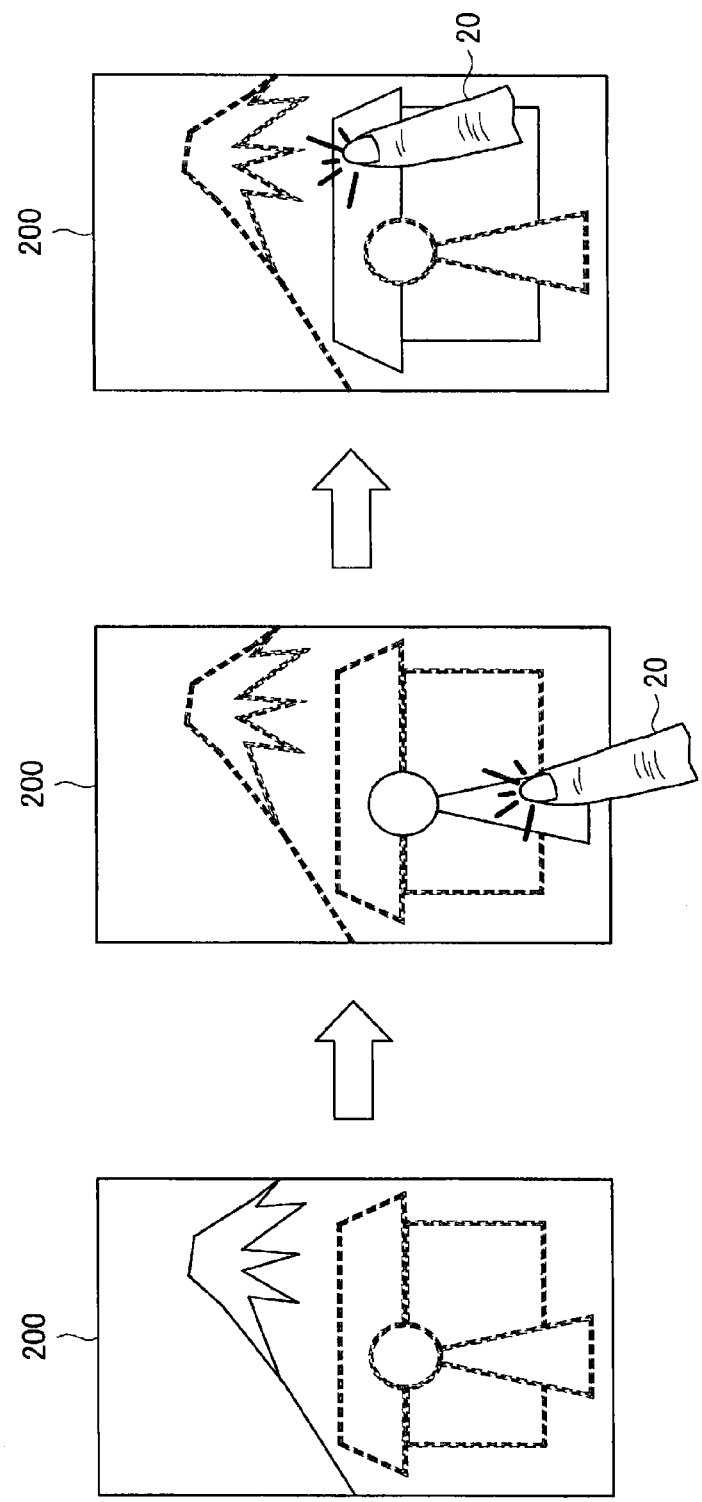
FIG. 7 is a diagram for describing an example defocusing process performed by an information processing device according to an embodiment of the present disclosure.

Next, the defocusing performed by the touch operation will be specifically described with reference to FIG. 7. FIG. 7 is a diagram for describing an example defocusing process of the information processing device 100 of the embodiment of the present disclosure.

FIG. 7 shows an image 200 in which a person, a house, and a mountain have been captured as subjects. An example in which an in-focus location in the image 200 is changed by the user's operation performed on the information processing device 100, will now be described.

Firstly, when the user 20 performs a touch operation at a location in the image 200 where a person is displayed, the operation detection unit 104 detects the touch operation, and the setting unit 110 sets a depth portion which is to be in focus based on a location in the image corresponding to the touch location detected by the operation detection unit 104. In addition, the setting unit 110 stores the set depth portion into the storage unit 112. Thereafter, the display control unit 114 causes the image 200 to be in focus based on the depth portion set by the setting unit 110. As a result, in response to the touch operation performed on the information processing device 100, as shown in the middle diagram of FIG. 7 the person is in focus and the mountain is out of focus in the image 200.

Next, after the user 20 has performed a touch operation at a location in the image 200 where the person is displayed, if the user performs a touch operation at a location in the image 200 where the house is displayed, the operation detection unit 104 detects the touch operation, and the setting unit 110 sets a depth portion which is to be in focus based on a location in the image corresponding to the touch location detected by the operation detection unit 104. In addition, the setting unit 110 stores the set depth portion into the storage unit 112. Thereafter, the display control unit 114 causes the image 200 to be in focus based on the depth portion set by the setting unit 110. As a result, in response to to the touch operation performed on the information processing device 100, as shown in the right figure of FIG. 7 the house is in focus and the person is out of focus in the image 200.

Next, after the end of the above operation, if the user instructs the information processing device 100 to change the in-focus location in the image 200 over time, the operation detection unit 104 detects the user's operation to instruct to perform the defocusing process, and the setting unit 110 temporally reads the depth portions stored in the storage unit 112, and sets the depth portions as portions which are to be in focus. Thereafter, the display control unit 114 causes the image 200 to be in focus based on the depth portions which are temporally set. As a result, the in-focus location in the image 200 is changed to the person and then the house in the image 200, sequentially in time, in accordance with the order in which these are set by the user's operation.

4-4. Defocusing Process

Figure 8:
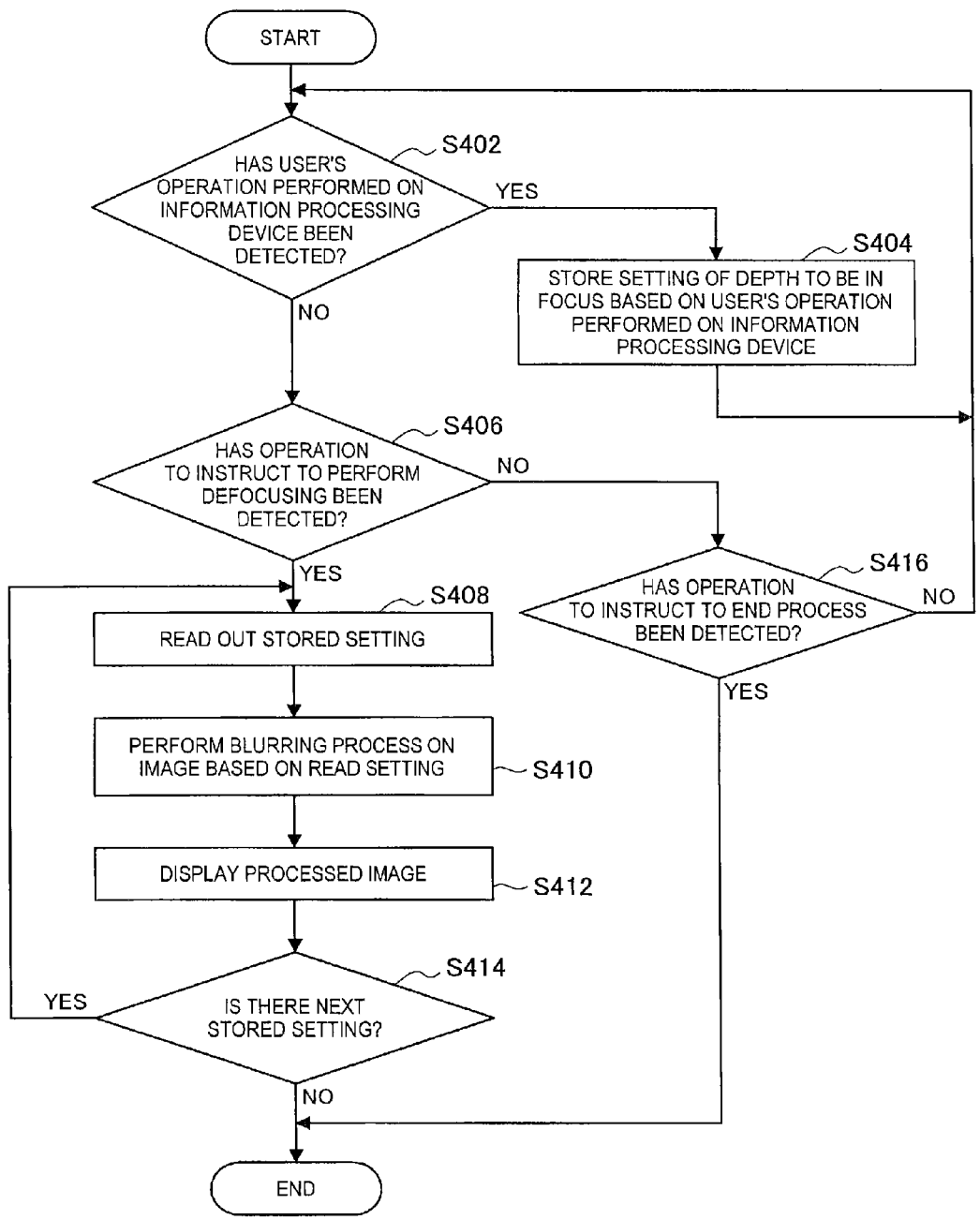
FIG. 8 is a flowchart showing the concept of a defocusing process performed by an information processing device according to an embodiment of the present disclosure.

Next, the defocusing process performed by the information processing device 100 of the embodiment of the present disclosure will be described with reference to FIG. 8. FIG. 8 is a flowchart showing the concept of the defocusing process performed by the information processing device 100 of the embodiment of the present disclosure.

Initially, the information processing device 100 accumulates the settings of portions which are to be in focus in order to prepare the defocusing process.

Initially, the operation detection unit 104 determines whether or not the user's operation performed on the information processing device 100 has been detected (step S402). Specifically, the operation detection unit 104 obtains information about an operation detected by a sensor etc., and determines whether or not the user's operation performed on the information processing device 100 has been detected.

If, in step S402, it is determined that the user's operation performed on the information processing device 100 has been detected, the setting unit 110 stores the setting of a portion which is to be in focus in accordance with the user's operation performed on the information processing device 100 which has been detected (step S404). Specifically, the setting unit 110 calculates a depth portion which is to be in focus based on the operation detected by the operation detection unit 104, and stores the calculated depth portion into the storage unit 112. Thereafter, after the calculated depth portion is stored into the storage unit 112, control returns to step S402.

If, in step S402, it is determined that the user's operation performed on the information processing device 100 has not been detected, the display control unit 114 determines whether or not an operation to instruct to perform the defocusing has been detected (S406). Specifically, the display control unit 114 determines whether or not the operation detection unit 104 has detected the user's operation to instruct to perform the defocusing.

If, in step S406, it is determined that an operation to instruct to perform defocusing has been detected, the information processing device 100 starts the defocusing process.

Initially, the setting unit 110 reads the stored setting of a portion which is to be in focus (step S408). Specifically, the setting unit 110 reads a depth portion to be in focus which is stored in the storage unit 112.

Next, based on the setting of the portion to be in focus which has been read out, the display control unit 114 performs the blurring process on the image (step S410). Specifically, the setting unit 110 sets the depth portion read from the storage unit 112 as a portion which is to be in focus, and the display control unit 114 causes a portion of the image having a depth included in the depth portion to be in focus which has been set by the setting unit 110, to be in focus.

Next, the display unit 116 displays the image on which the blurring process has been performed (step S412).

Next, the setting unit 110 determines whether or not there is the setting of the next portion to be in focus which has been stored (step S414). Specifically, the setting unit 110 determines whether or not there is the next portion to be in focus which is stored in the storage unit 112.

Note that if, in step S414, it is determined that there is the setting of the next portion to be in focus which has been stored, control returns to step S408.

If, in step S414, it is determined that there is not the setting of the next portion to be in focus which has been stored, the defocusing process is ended.

If, in step S406, it is determined that an operation to instruct to perform the defocusing has not been detected, the display control unit 114 determines whether or not an operation to instruct to end the process has been detected (step S416). Specifically, the display control unit 114 determines whether or not the operation detection unit 104 has detected the user's operation to instruct to end the process.

If, in step S416, it is determined that the operation to instruct to end the process has been detected, the defocusing process is ended.

Note that if, in step S416, it is determined that the operation to instruct to end the process has not been detected, control returns to step S402.

Thus, in the information processing device 100, the setting of a depth portion to be in focus which has been specified is stored in the storage unit 112 in a time-series fashion, and the image is caused to be in focus based on the depth portions sequentially read from the storage unit 112. Therefore, the settings of depth portions to be in focus which have been stored are sequentially read out, whereby a moving image in which the in-focus location of the image is changed over time can be generated.

4-5. Example Defocusing by Drag Operation

In the setting of a portion to be in focus in the defocusing performed by the information processing device 100 of this embodiment, a depth of field, which is the width of a depth at which an image is in focus, may be set based on the user's operation performed on the information processing device 100.

Specifically, in the information processing device 100, a depth portion possessed by a portion of an image specified by an operation performed on the information processing device 100 is a portion which is to be in focus, and a change over time in depth width of the depth portion which is changed based on the amount of a change in the operation performed on the information processing device 100 is stored. Thereafter, the information processing device 100 sequentially reads out the stored depth widths, sets depth portions having the depth widths thus read as portions to be in focus, and causes portions of the image having depths included in the set depth portions to be in focus. A more specific description will be given with reference to FIG. 9. FIG. 9 is a diagram for describing example defocusing performed based on a drag operation performed on the information processing device 100 of the embodiment of the present disclosure.

The left figure of FIG. 9 shows an image 200 in which three persons have been captured as subjects. An example in which the depth of field of the image 200 is changed based on the user's operation performed on the information processing device 100, will now be described.

Initially, when the user 20 performs a touch operation on a location in the image 200 where a person closest to the viewer (the user 20) is displayed, the setting unit 110 sets the depth width of a portion which is to be in focus to the depth width of the location where the closest person is displayed, based on the location in the image 200 which has been detected by the operation detection unit 104. Thereafter, the display control unit 114 displays, on the display unit 116, the image 200 which has been caused to be in focus based on the setting. As a result, in the image 200, the closest person is in focus as shown in the second figure from the left of FIG. 9.

Next, when the user 20 performs a rightward drag operation with respect to the image 200, the setting unit 110 adds a depth width to the set depth width of the portion to be in focus, based on the amount of the operation detected by the operation detection unit 104, to set a new portion to be in focus. Thereafter, the display unit 116 displays the image 200 which has been caused by the display control unit 114 to be in focus based on the setting. As a result, in the image 200, the closest person and the second closest person are in focus as shown in the second figure from the right of FIG. 9.

Next, when the user 20 continues to perform a rightward drag operation with respect to the image 200, the setting unit 110 adds a depth portion to the set depth portion of a portion to be in focus based on the amount of the operation detected by the operation detection unit 104, to set a new portion to be in focus. Thereafter, the display unit 116 displays the image 200 which has been caused by the display control unit 114 to be in focus based on the setting. As a result, in the image 200, all of the persons are in focus as shown in the right figure of FIG. 9.

Thus, in the information processing device 100, a depth portion possessed by a portion of an image specified by an operation performed on the information processing device 100 is a portion which is to be in focus, and a change over time in depth width of the depth portion changed based on the amount of a change in an operation performed on the information processing device 100 is stored. Thereafter, in the information processing device 100, the stored depth widths are sequentially read out, depth portions having the depth widths thus read out are set as portions which are to be in focus, and portions of the image having depths included in the set depth portions are caused to be in focus. Therefore, the depth width of a portion to be in focus is set to be expanded or contracted based on the user's operation performed on the information processing device 100, whereby the user can intuitively adjust the depth of field of the image 200.

4-6. Example Defocusing by Tilt Shift Operation

In the defocusing performed by the information processing device 100 of this embodiment, a depth portion which is to be in focus may be set based on a motion of the information processing device 100. For example, in the information processing device 100, a blur which occurs due to a positional relationship between a lens and a sensor plane, such as a tilt shift of a digital camera etc., may be produced by setting a depth portion which is to be in focus based on a change in orientation of the information processing device 100, where the orientation of the information processing device 100 is considered as the orientation of the lens.

Specifically, in the information processing device 100, a change over time in a depth portion to be in focus which is changed based on a change in orientation of the information processing device 100 is stored. The stored depth portions are sequentially read out and set as portions which are to be in focus. Portions of an image having depths included in the set depth portions are caused to be in focus.

Figure 10A:
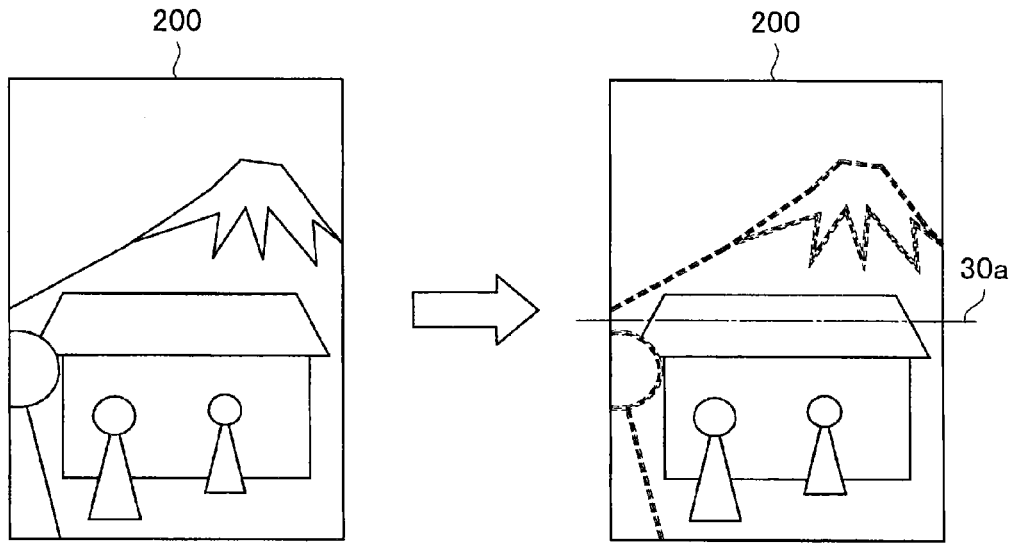
FIG. 10A is a diagram for describing example defocusing based on a tilt shift operation performed on an information processing device according to an embodiment of the present disclosure.
Figure 10B:
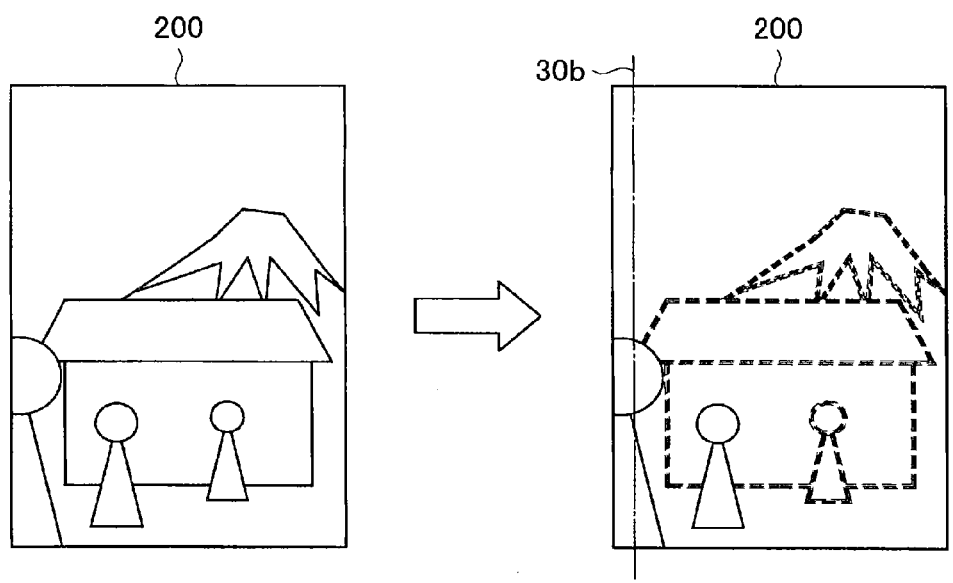
FIG. 10B is a diagram for describing another example defocusing based on a tilt shift operation performed on an information processing device according to an embodiment of the present disclosure.

More specifically, the motion detection unit 106 detects a change in orientation of the information processing device 100, and the setting unit 110 stores a depth portion possessed by a portion of an image overlapping a straight line on the image which extends in parallel to the axis of rotation of the orientation based on the orientation change detected by the motion detection unit 106, as a portion which is to be in focus. Thereafter, the setting unit 110 reads out the stored depth portion, and sets the read depth portion as a portion to be in focus. The display control unit 114 causes a portion of the image having a depth included in the set depth portion to be in focus. A further description will be given with reference to FIGS. 10A and 10B. FIG. 10A is a diagram for describing example defocusing based on the tilt shift operation performed on the information processing device 100 of the embodiment of the present disclosure. FIG. 10B is a diagram for describing another example defocusing based on the tilt shift operation performed on the information processing device 100 of the embodiment of the present disclosure.

The left figure of FIG. 10A shows an image 200 in which three persons, a house, and a mountain have been captured as subjects. An example in which an in-focus location in the image 200 is changed based on a change in orientation of the information processing device 100, will now be described.

Initially, when the user slants the information processing device 100 clockwise about the X axis of FIG. 1, the motion detection unit 106 detects a change in orientation of the information processing device 100. Next, the setting unit 110 stores, as a portion which is to be in focus, a depth portion possessed by a portion of the image overlapping a straight line 30a on the image extending in parallel to the X axis, based on a change in orientation detected by the motion detection unit 106. Thereafter, the setting unit 110 reads and sets the stored depth portion as a portion which is to be in focus. The display control unit 114 causes a portion of the image having a depth included in the set depth portion to be in focus. As a result, in response to the clockwise slant about the X axis of the information processing device 100, as shown in the right figure of FIG. 10A, in the image 200, the house overlapping the straight line 30a, and the two persons in front of the house having a depth included in the depth portion of the house, are caused to be in focus, and a person in the image 200 closest to the viewer, and the mountain in the background, are blurred.

The left figure of FIG. 10B shows an image 200 in which three persons, a house, and a mountain have been captured as subjects, similar to the left figure of FIG. 10A. An example in which an in-focus location in the image 200 is changed based on a change in orientation of the information processing device 100, will now be described.

Initially, when the user slants the information processing device 100 clockwise about the Y axis of FIG. 1, the motion detection unit 106 detects a change in orientation of the information processing device 100. Next, the setting unit 110 stores, as a portion which is to be in focus, a depth portion possessed by a portion of the image overlapping a straight line 30b on the image extending in parallel to the Y axis, based on a change in orientation detected by the motion detection unit 106. Thereafter, the setting unit 110 reads and sets the stored depth portion as a portion to be in focus. The display control unit 114 causes a portion of the image having a depth included in the set depth portion to be in focus. As a result, in response to the clockwise slant about the Y axis of the information processing device 100, as shown in the right figure of FIG. 10B, in the image 200, the leftmost person overlapping the straight line 30b, and the person to the immediate right of the leftmost person, that has a depth included in the depth portion of the leftmost person, are caused to be in focus, and the rightmost person in the image 200, the house, and the mountain are blurred.

Thus, in the information processing device 100, a change over time in a depth portion to be in focus which is changed based on a change in orientation of the information processing device 100 is stored. The stored depth portions are sequentially read out and set as portions which are to be in focus. Portions of the image having depths included in the set depth portions are caused to be in focus. Therefore, by setting a depth portion which to be in focus based on a change in orientation of the information processing device 100, the user can intuitively set an in-focus location.

4-7. Example Automatic Process of Blurring Process

The defocusing performed by the information processing device 100 of this embodiment may be automatically performed in accordance with a program. Specifically, the information processing device 100 sets a depth portion which is to be in focus in accordance with a program, and performs the blurring process on an image based on the set depth portion. More specifically, in accordance with a program stored in the storage unit 112, the setting unit 110 changes a depth portion set as a portion which is to be in focus, and the display control unit 114 performs the blurring process on an image based on the change in the depth portion set by the setting unit 110.

Thus, the information processing device 100 changes the setting of a depth portion which is to be in focus in accordance with a program, and performs the blurring process on an image based on the change in the set depth portion. Therefore, by setting a depth portion which is to be in focus in accordance with a program, a moving image can be generated in which an in-focus location in an image is changed in accordance with a predetermined rule.

5. Light Painting

5-1. Background

A technique of taking a photograph which captures the trajectory of light, called light painting, has in recent years been commonly and widely used. Light painting is a technique of capturing an image of the trajectory of a light source which is caused by moving the light source, such as a light etc., during a long exposure of a camera.

However, while the user is drawing an image, it is difficult for the user to see or check the result of the drawing.

Also, there is a demand for a technique of performing light painting on an image after the image has been captured.

Therefore, an information processing device and information processing method with which a trajectory of a light source can be drawn on an image having depth information while seeing or checking the trajectory, will be proposed.

5-2. Overview of Light Painting

Firstly, light painting performed by the information processing device 100 of the embodiment of the present disclosure will be outlined.

The light painting performed by the information processing device 100 refers to superimposing a trajectory of a light source onto an image having depth information based on the user's operation performed on the information processing device 100 and a movement of the information processing device 100.

Specifically, in the light painting process, the user's operation performed on the information processing device 100 and a movement of the information processing device 100 are detected. Next, in the process, for an image having a depth at each flat-plane location, a flat-plane location is set based on the detected user's operation performed on the information processing device 100, and a depth location is set based on the detected movement of the information processing device 100. Thereafter, in the process, a trajectory of a light source indicating changes in the set flat-plane location and depth location is superimposed. For example, if the user moves the information processing device 100 in the depth direction, i.e., in the Z-axis direction of FIG. 1, while specifying flat-plane locations in an image by operating the touchscreen, a trajectory of a light source moving in the depth direction is superimposed onto the image.

Thus, in the light painting performed by the information processing device 100, a flat-plane location and a depth location are set in an image based on the user's operation performed on the information processing device 100 and a movement of the information processing device 100, and a trajectory of a light source indicating changes in the flat-plane location and depth location is superimposed onto the image. Therefore, by setting flat-plane locations related to a trajectory of a light source based on the user's operation which is performed on the information processing device 100 within the range of the user's visual field, the user can draw the trajectory of the light source while seeing or checking the trajectory of the light source.

5-3. Details of Light Painting

An operation of each function of the information processing device 100 for implementing the light painting operation will be described.

The light painting is implemented by operations of the operation detection unit 104, the motion detection unit 106, the setting unit 110, the display control unit 114, and the display unit 116.

The operation detection unit 104 detects the user's operation performed on the information processing device 100. The motion detection unit 106 detects a movement of the information processing device 100. The setting unit 110 is notified of the results of these detections.

The setting unit 110 sets a flat-plane location based on the detection result of the operation detection unit 104 and a depth location based on the detection result of the motion detection unit 106. Specifically, the setting unit 110 sets the coordinates of a flat-plane location in an image where an operation has been detected, and sets, as a depth location, a depth which is obtained by changing the immediately previous depth based on the amount of a change in the detected location of the information processing device 100.

The display control unit 114 superimposes, onto the image, a trajectory of a light source indicating changes in the flat-plane location and depth location set by the setting unit 110. Specifically, the display control unit 114 adds, to a trajectory of a light source which has been superimposed onto the image, a trajectory indicating a movement of the light source from the immediately previously set flat-plane location and depth location to a flat-plane location and depth location set by the setting unit 110, and superimposes the resultant trajectory of the light source onto the image.

The display unit 116 displays an image onto which a trajectory of a light source has been superimposed.

Figure 11:
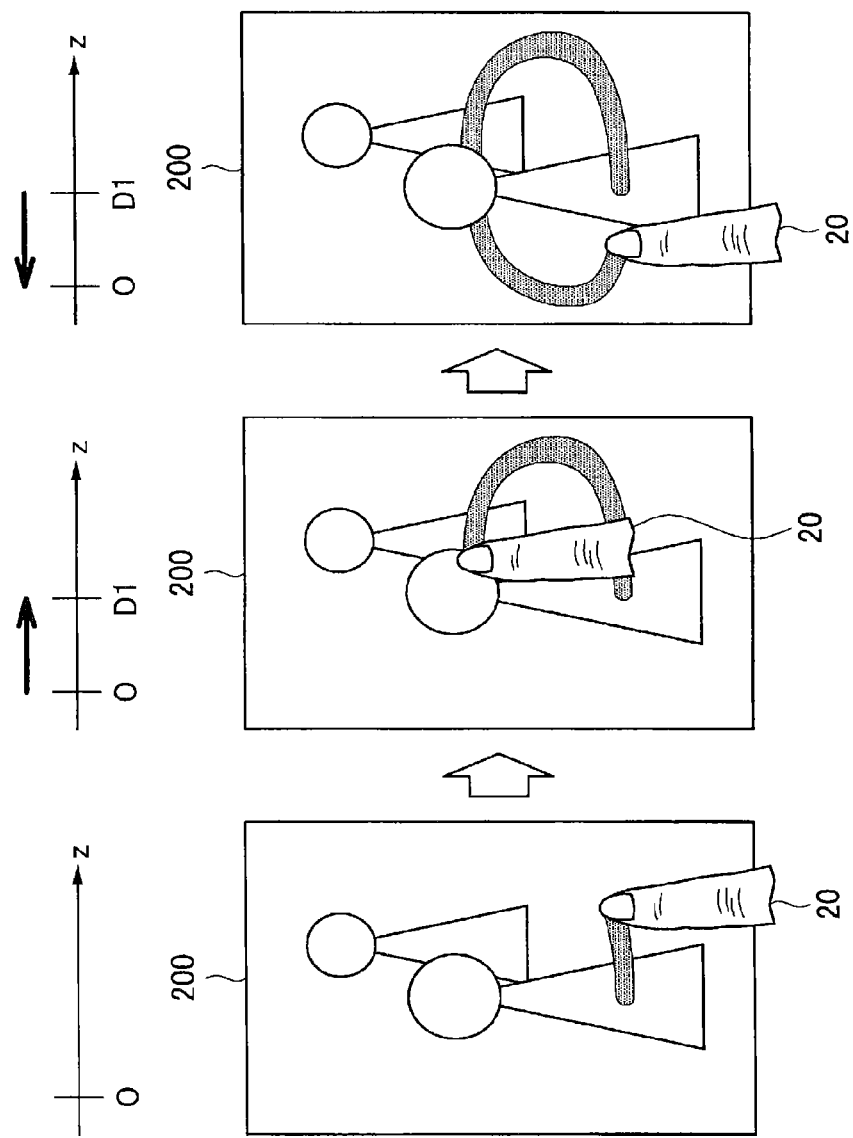
FIG. 11 is a diagram for describing example light painting performed by an information processing device according to an embodiment of the present disclosure.

Next, the light painting will be specifically described with reference to FIG. 11. FIG. 11 is a diagram for describing an example of the light painting performed by the information processing device 100 of the embodiment of the present disclosure.

The upper portion of FIG. 11 shows conceptual diagrams indicating motions in the Z-axis direction of the information processing device 100 of FIG. 1. The lower portion of FIG. 11 shows the user's operations performed on the information processing device 100.

FIG. 11 shows an image 200 in which two persons have been captured as subjects. An example in which a trajectory of a light source superimposed onto the image 200 is changed based on the user's operation performed on the information processing device 100 and a motion of the information processing device 100, will now be described.

Initially, when the user 20 performs a touch operation at a location in front of the person closer to the viewer (the user 20), and then a rightward drag operation with respect to the image 200, the operation detection unit 104 detects the touch location. Next, the setting unit 110 sets a flat-plane location in the image 200 corresponding to the touch location obtained from the operation detection unit 104, and sets a depth location in the image 200 corresponding to the amount of a change in location of the information processing device 100 due to the motion thereof detected by the motion detection unit 106. Thereafter, the display control unit 114 superimposes the light source onto the image 200 at the flat-plane location and depth location set by the setting unit 110. Next, the operation detection unit 104 detects touch locations changing due to the drag operation. Next, the setting unit 110 sets the changing touch locations obtained from the operation detection unit 104 as flat-plane locations in the image 200 in a time-series fashion. Thereafter, the display control unit 114 superimposes, onto the image 200, a trajectory of the light source which is extended based on the flat-plane locations which have been set by the setting unit 110 in a time-series fashion. As a result, in response to the touch operation and drag operation, as shown in the left figure of FIG. 11 the trajectory of the light source is superimposed onto the image 200 in front of the person closer to the viewer.

Next, when the user 20 continues to perform the drag operation up to the back of the person of the image 200 closer to the viewer, and moves the information processing device 100 to a location D1 in the Z-axis direction, the motion detection unit 106 detects a movement of the information processing device 100 from the location O to the location D1 in the positive direction of the Z axis, and the operation detection unit 104 detects touch locations changing due to the drag operation. Next, the setting unit 110 sets flat-plane locations of the light source in the image 200 corresponding to the changing touch locations obtained from the operation detection unit 104 in a time-series fashion, and sets depth locations of the light source obtained by changing the immediately previous depth based on the amount of each change in the location in the positive direction of the Z axis of the information processing device 100 obtained from the motion detection unit 106 in a time-series fashion. Thereafter, the display control unit 114 superimposes, onto the image 200, a trajectory of the light source which is extended based on the flat-plane locations and depth locations set by the setting unit 110 in a time-series fashion. As a result, in response to the drag operation and the movement in the positive direction of the Z axis of the information processing device 100, as shown in the middle figure of FIG. 11 a trajectory of the light source extending from the front of the person of the image 200 closer to the viewer to the back of that person, is superimposed.

Next, when the user 20 continues to perform the drag operation up to the left side of the person of the image 200 closer to the viewer, and moves the information processing device 100 back to the location O in the Z-axis direction, the motion detection unit 106 detects a movement of the information processing device 100 in the positive direction of the Z axis, and the operation detection unit 104 detects touch locations changing due to the drag operation. Next, the setting unit 110 sets flat-plane locations of the light source in the image 200 corresponding to the changing touch locations obtained from the operation detection unit 104 in a time-series fashion, and sets depth locations of the light source obtained by changing the immediately previous depth based on the amount of each change in the location in the positive direction of the Z axis of the information processing device 100 obtained from the motion detection unit 106 in a time-series fashion. Thereafter, the display control unit 114 superimposes, onto the image 200, a trajectory of the light source which is extended based on the flat-plane locations and depth locations set by the setting unit 110 in a time-series fashion. As a result, in response to the drag operation and the movement in the positive direction of the Z axis of the information processing device 100, as shown in the right figure of FIG. 11 a trajectory of the light source extending from the front of the person of the image 200 closer to the viewer through the back of that person to the left side of that person, is superimposed.

Here, the movement of the information processing device 100 in the Z-axis direction of FIG. 11 is typically performed within the range in which the user's hand can be moved.

Figure 12A:
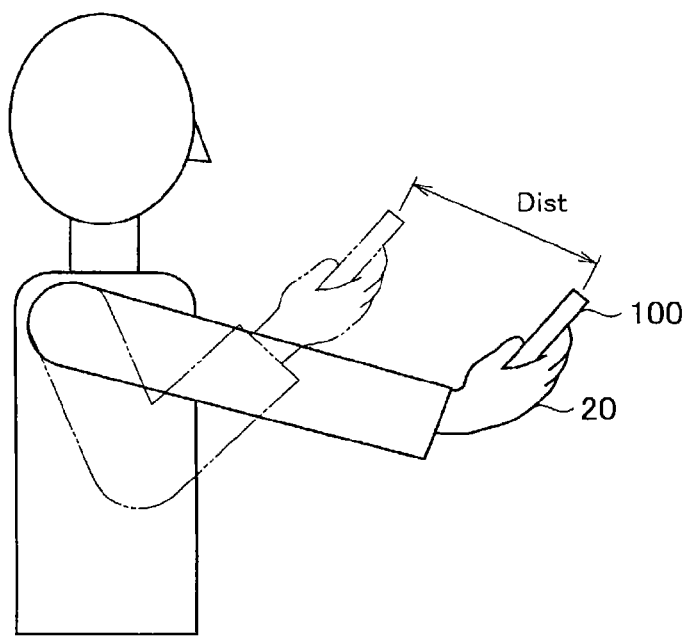
FIG. 12A is a diagram for describing an example movement range of an information processing device according to an embodiment of the present disclosure.
Figure 12B:
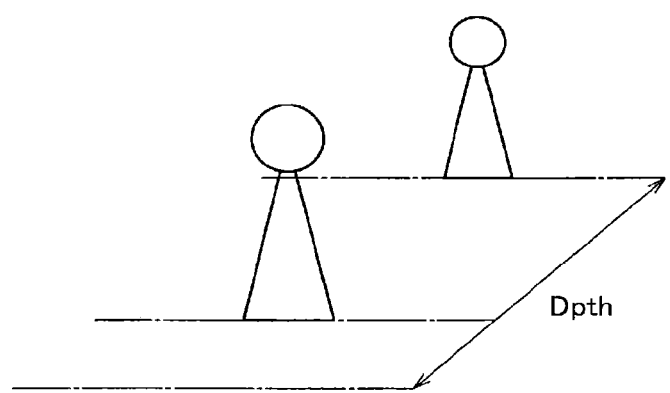
FIG. 12B is a conceptual diagram showing a depth in an image in an information processing device according to an embodiment of the present disclosure.

Therefore, the information processing device 100 performs a process of associating a location of the information processing device 100 with a depth in an image. A specific description will be given with reference to FIGS. 12A and 12B. FIG. 12A is a diagram for describing an example movement range of the information processing device 100 of the embodiment of the present disclosure. FIG. 12B is a conceptual diagram showing a depth in an image in the information processing device 100 of the embodiment of the present disclosure.

As shown in FIG. 12A, it is assumed that the user 20 can move the information processing device 100 within a range having a width Dist. For example, the width Dist may have a predetermined value. As shown in FIG. 12B, the depth of the image 200 has a range having a width Dpth. For example, the width Dpth may be 0 to 255. Here, in the information processing device 100, the width Dist and the width Dpth correspond to each other over the entire range. For example, if Dist=0 to 40 cm and Dpth=0 to 255, a movement distance of 10 cm of the information processing device 100 corresponds to a depth of 64.

Thus, in the information processing device 100, the movement range Dist of the hand of the user 20 is associated with the depth width Dpth. Therefore, a depth can be selected within the entire movement range of the hand of the user 20. The user 20 can perform drawing while seeing or checking a trajectory of a light source superimposed onto an image.

5-4. Light Painting Process

Next, the light painting process performed by the information processing device 100 of the embodiment of the present disclosure will be described with reference to FIG. 13. FIG. 13 is a flowchart showing the concept of the light painting process performed by the information processing device 100 of the embodiment of the present disclosure.

Initially, the setting unit 110 initializes the location of the information processing device 100 (step S502). Specifically, the setting unit 110 sets the location of the information processing device 100 specified by the user as a reference. For example, the location of the information processing device 100 is a relative location with respect to the reference location as the origin.

Next, the operation detection unit 104 determines whether or not the user's operation performed on the information processing device 100 has been detected (step S504). Specifically, the operation detection unit 104 obtains information about a detected operation from a sensor etc. to determine whether or not the user's operation performed on the information processing device 100 has been detected.

If, in step S504, it is determined that the user's operation performed on the information processing device 100 has been detected, the setting unit 110 sets a flat-plane location and depth location of the light source as a location where drawing begins (step S506). Specifically, the setting unit 110 sets a flat-plane location in an image corresponding to an operation location which has been detected by the operation detection unit 104, as a location where a trajectory of a light source begins, and sets a depth location based on the amount of a change in the location from the reference location in a motion of the information processing device 100 which has been detected by the motion detection unit 106.

If, in step S504, it is determined that the user's operation performed on the information processing device 100 has not been detected, the information processing device 100 waits until an operation is detected.

After a light source is set, the operation detection unit 104 determines whether or not the user's operation performed on the information processing device 100 has been detected (step S508). Specifically, the operation detection unit 104 obtains information about a detected operation from a sensor etc. to determine whether or not an operation following the operation detected in step S504 has been detected.

If, in step S508, it is determined that a change in location of the user's operation performed on the information processing device 100 has been detected, the motion detection unit 106 determines whether or not a motion of the information processing device 100 has been detected (step S510). Specifically, the motion detection unit 106 obtains information about a change in the location from a sensor etc. to determine whether or not a change in location of the information processing device 100 has been detected.

If, in step S510, it is determined that a motion of the information processing device 100 has been detected, the setting unit 110 changes a depth location based on the motion of the information processing device 100 (step S512). Specifically, the setting unit 110 sets, as a depth location, a depth which is obtained by changing the immediately previous depth based on the amount of each change in the location detected by the motion detection unit 106.

If, in step S510, it is determined that a motion of the information processing device 100 has not been detected, control proceeds to step S514.

Next, the operation detection unit 104 determines whether or not a change in the operation performed on the information processing device 100 has been detected (step S514). Specifically, the operation detection unit 104 obtains information about a detected change in the operation from a sensor etc. to determine whether or not an operation following the operation detected in step S504 has been detected.

If, in step S514, it is determined whether or not a change in location of the user's operation performed on the information processing device 100 has been detected, the setting unit 110 changes a flat-plane location based on the change in location of the user's operation performed on the information processing device 100 (step S516). Specifically, the setting unit 110 sets a flat-plane location in the image corresponding to the operation location detected by the operation detection unit 104.

If, in step S514, it is determined that a change in location of the user's operation performed on the information processing device 100 has not been detected, control returns to step S508.

Next, the display control unit 114 superimposes, onto the image, a trajectory of the light source indicating the flat-plane location changed by the setting unit 110 and a change in depth location (step S518). Specifically, the display control unit 114 adds, to a trajectory of the light source superimposed on the image, a trajectory of a movement of the light source from the immediately previously set flat-plane location and depth location to the flat-plane location and depth location changed by the setting unit 110, and superimposes the resultant trajectory of the light source onto the image.

Next, the display unit 116 displays the image onto which the trajectory of the light source has been superimposed by the display control unit 114 (step S520). After the image is displayed, control returns to step S510.

If, in step S508, it is determined that the user's operation performed on the information processing device 100 has not been detected, the light painting process is ended.

Thus, the information processing device 100 detects the user's operation performed on the information processing device 100 and a movement of the information processing device 100, sets a flat-plane location in an image based on the detected operation, and sets a depth location in the image based on the detected movement. Thereafter, a trajectory of a light source indicating changes in the set flat-plane location and depth location is superimposed onto the image. Therefore, by setting a flat-plane location for a trajectory of a light source based on the user's operation which is performed on the information processing device 100 within the range of the visual field, the user can perform drawing while seeing or checking the trajectory of the light source.

5-5. Example Change Over Time in Light Painting

In the light painting performed by the information processing device 100 of this embodiment, a trajectory of a light source superimposed onto an image may be changed over time. Specifically, the setting unit 110 changes the settings of the flat-plane location and depth location over time, and the display control unit 114 changes a trajectory of a light source superimposed onto an image based on changes in the flat-plane location and depth location set by the setting unit 110.

More specifically, the setting unit 110 stores flat-plane locations set based on the user's operations performed on the information processing device 100 and depth locations set based on movements of the information processing device 100, and reads and sets the stored flat-plane locations and depth locations sequentially in time. Thereafter, the display control unit 114 sequentially changes a trajectory of a light source based on changes in the flat-plane location and depth location which have been set sequentially in time by the setting unit 110, and superimposes the resultant trajectory of the light source onto an image.

Thus, the information processing device 100 stores flat-plane locations and depth locations set based on the user's operations performed on the information processing device 100 and movements of the information processing device 100, that have been detected. Thereafter, the information processing device 100 reads and sets the stored flat-plane locations and depth locations sequentially in time, and changes a trajectory of a light source to be superimposed based on changes in the flat-plane locations and depth locations set sequentially in time. Therefore, the stored flat-plane locations and depth locations are read and set sequentially in time, whereby a moving image can be generated in which a trajectory of a light source superimposed onto an image is changed sequentially in time.

5-6. Example Automatic Process of Light Painting

The light painting performed by the information processing device 100 of this embodiment may be performed in accordance with a program. Specifically, the information processing device 100 sets flat-plane locations and depth locations in accordance with a program, and superimposes a trajectory of a light source indicating changes in the set flat-plane locations and depth locations onto an image. More specifically, the setting unit 110 may change a flat-plane location and depth location to be set, in accordance with a program stored in the storage unit 112, and the display control unit 114 superimposes a trajectory of a light source indicating changes in the flat-plane location and depth location set by the setting unit 110 to an image.

Thus, the information processing device 100 changes the settings of a flat-plane location and depth location in accordance with a program, and superimposes a trajectory of a light source indicating changes in the set flat-plane locations and depth locations onto an image. Therefore, flat-plane locations and depth locations are set in accordance with a program, whereby a trajectory of a light source which is generated in accordance with a predetermined rule can be accurately superimposed onto an image.

6. Segmentation

6-1. Background

Electronic devices or applications for extracting a portion of an image from the image have in recent years been proposed.

However, in general, editing of an image which can induce a sense of depth requires a lot of complicated operations compared to two-dimensional editing, which does not take account of the depth direction of an image, and as a result, it mostly takes a lot of time and effort to do the editing task.

Therefore, an information processing device and information processing method with which a portion having a desired depth can be intuitively extracted from an image having depth information, will now be proposed.

6-2. Overview of Segmentation

Firstly, segmentation performed by the information processing device 100 of the embodiment of the present disclosure will be outlined.

The segmentation performed by the information processing device 100 refers to extracting a portion of an image corresponding to a depth segment of the image which is determined based on a movement of the information processing device 100.

Specifically, in the segmentation, a depth portion corresponding to the amount of a change in location caused by a detected change in location of the information processing device 100 is set as a depth segment to be extracted, and a portion of an image corresponding to the set depth segment is extracted. For example, when the user moves the information processing device 100 in the depth direction, i.e., the Z-axis direction of FIG. 1, a depth portion to be extracted is changed, depending on the distance of the movement, the depth portion is set as a depth segment, and a portion of an image corresponding to the depth segment is extracted.

Thus, in the segmentation performed by the information processing device 100, a movement of the information processing device 100 is detected, a depth segment which is a depth portion to be extracted is set based on the amount of the movement, and a portion of an image corresponding to the set depth segment is extracted

6-3. Details of Segmentation

An operation of each function of the information processing device 100 for implementing the segmentation process will be described.

The segmentation is implemented by operations of the motion detection unit 106, the setting unit 110, the display control unit 114, and the display unit 116.

The motion detection unit 106 detects a movement of the information processing device 100. The motion detection unit 106 notifies the setting unit 110 of the result of the detection.

The setting unit 110 sets a depth segment to be extracted of an image based on the detection result of the motion detection unit 106. Specifically, the setting unit 110 sets, as a depth segment, a depth portion corresponding to the amount of a change in location caused by a detected change in location of the information processing device 100.

The display control unit 114 extracts a portion of an image corresponding to the depth segment set by the setting unit 110. Specifically, the display control unit 114 extracts a portion of an image having a depth corresponding to the depth segment set by the setting unit 110.

The display unit 116 displays the portion of the image extracted by the display control unit 114.

Figure 14:
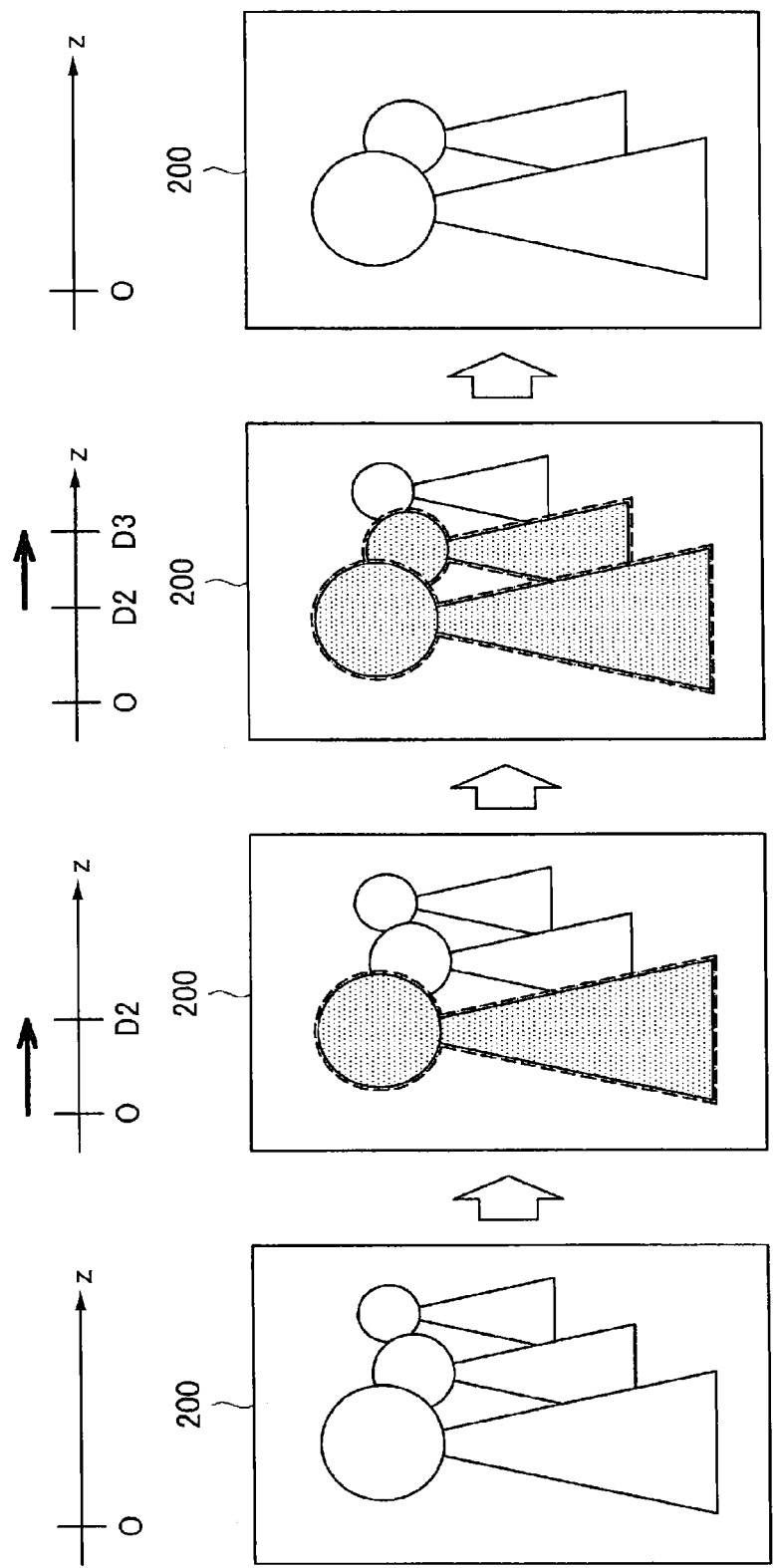
FIG. 14 is a diagram for describing example segmentation performed by an information processing device according to an embodiment of the present disclosure.

Next, the segmentation will be specifically described with reference to FIG. 14. FIG. 14 is a diagram for describing an example of the segmentation performed by the information processing device 100 of the embodiment of the present disclosure.

The upper portion of FIG. 14 shows conceptual diagrams indicating motions in the Z-axis direction of the information processing device 100 of FIG. 1. The lower portion of FIG. 14 shows images displayed on the display unit 116 of the information processing device 100.

FIG. 14 shows an image 200 in which three persons have been captured as subjects, side by side in the depth direction. An example in which a portion of the image 200 is extracted based on a motion of the information processing device 100 will now be described.

Initially, when the user 20 moves the information processing device 100 to a location D2 in the Z-axis direction, the motion detection unit 106 detects the movement in the positive direction of the Z axis of the information processing device 100. Next, the setting unit 110 sets, as a depth segment, a depth portion corresponding to the amount of the movement from O to D2 in the positive direction of the Z axis which has been obtained from the motion detection unit 106. Thereafter, the display control unit 114 causes a portion of the image 200 having a depth corresponding to the depth segment set by the setting unit 110 to be in the selected state. As a result, in response to the movement in the positive direction of the Z axis of the information processing device 100, as shown in the second figure from the left of FIG. 2 the person closest to the viewer (the user 20) of the image 200 is caused to be in the selected state.

Next, when the user 20 moves the information processing device 100 from the location D2 to a location D3 in the Z-axis direction, the motion detection unit 106 detects the movement in the positive direction of the Z axis of the information processing device 100. Next, the setting unit 110 calculates the location D3 after the movement based on the movement in the positive direction of the Z axis of the motion detection unit 106, and sets a group of depth portions corresponding to the calculated location D3 as a depth segment. Thereafter, the display control unit 114 causes a portion of the image 200 having a depth corresponding to the depth segment set by the setting unit 110 to be in the selected state. As a result, in response to the further movement in the positive direction of the Z axis of the information processing device 100, as shown in the second figure from the right of FIG. 2 the person closest to the viewer of the image 200 and the person next to that person in the depth direction are caused to be in the selected state.

Next, when the user 20 performs an input operation etc. on the information processing device 100 to determine a portion of the image 200 to be extracted, the operation detection unit 104 detects the user's operation performed on the information processing device 100. If the operation detection unit 104 has detected the operation, the display control unit 114 extracts the selected portion of the image 200, and displays only the extracted portion of the image 200. As a result, in response to the user's operation performed on the information processing device 100, as shown in the right figure of FIG. 14 only the person closest to the viewer of the image 200 and the person next to that person in the depth direction, which are in the selected state, are extracted and displayed.

6-4. Segmentation Process

Figure 15:
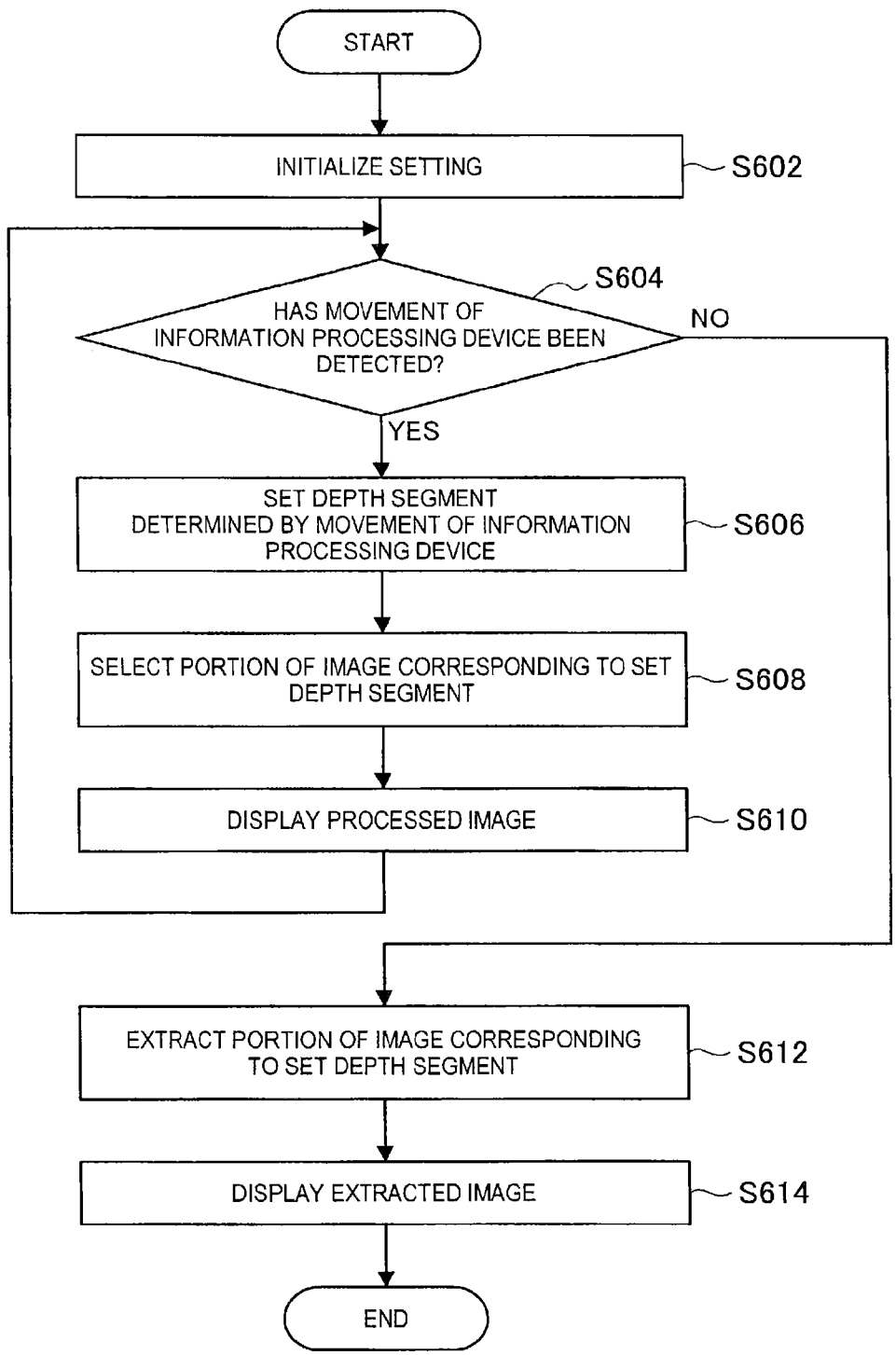
FIG. 15 is a flowchart showing the concept of a segmentation process performed by an information processing device according to an embodiment of the present disclosure.

Next, the segmentation process performed by the information processing device 100 of the embodiment of the present disclosure will be described with reference to FIG. 15. FIG. 15 is a flowchart showing the concept of the segmentation process performed by the information processing device 100 of the embodiment of the present disclosure.

Initially, the setting unit 110 initializes the setting of a depth segment (step S602).

Next, the motion detection unit 106 determines whether or not a movement of the information processing device 100 has been detected (step S604). Specifically, the motion detection unit 106 obtains information about a change in the location from a sensor etc. to determine whether or not a change in location of the information processing device 100 has been detected.

If, in step S604, it is determined that a movement of the information processing device 100 has been detected, the setting unit 110 sets a depth segment which is determined by the movement of the information processing device 100 (step S606). Specifically, the setting unit 110 sets, as a depth segment, a depth portion corresponding to the amount of a change in location caused by a detected change in the location detected by the motion detection unit 106.

Next, the display control unit 114 causes a portion of the image corresponding to the depth segment set by the setting unit 110 to be in the selected state (step S608). Specifically, the display control unit 114 causes a portion of the image having a depth included in the set depth segment to be in the selected state.

Next, the display unit 116 displays the image a portion of which has been caused by the display control unit 114 to be in the selected state (step S610). After the image is displayed by the display unit 116, control returns to step S604.

If, in step S604, it is determined that a movement of the information processing device 100 has been detected, the display control unit 114 extracts the selected portion of the image, i.e., a portion of the image corresponding to the set depth segment (step S612). Specifically, the display control unit 114 extracts a portion of the image having a depth included in the set depth segment.

Next, the display unit 116 displays only the portion of the image extracted by the display control unit 114 (step S614).

Thus, the information processing device 100 detects a movement of the information processing device 100, sets a depth segment of an image which is to be extracted based on the detected movement, and extracts a portion of the image corresponding to the depth segment. Therefore, by setting a depth segment of an image to be extracted based on a movement of the information processing device 100, the user can intuitively extract a portion of the image corresponding to a depth of the image.

6-5. Example Pop-out Photography

The segmentation performed by the information processing device 100 of this embodiment may be used to perform so-called pop-out photography. Specifically, the information processing device 100 sets a depth segment which is to be extracted based on a movement of the information processing device 100, and in addition, sets a portion of an image which is not the set depth segment, as a portion to be extracted, based on the user's operation performed on the information processing device 100 and a change in orientation of the information processing device 100.

Figure 16:
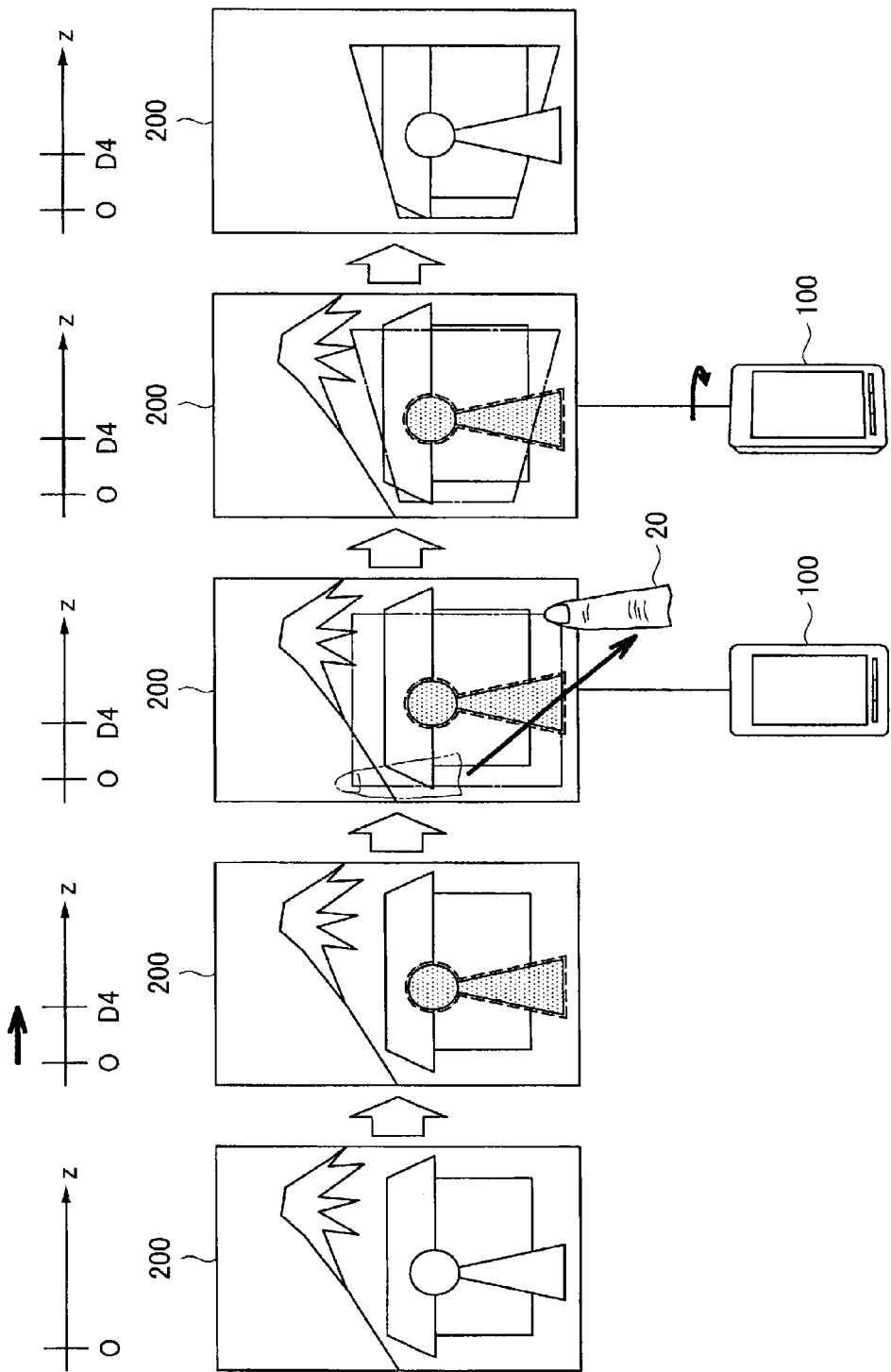
FIG. 16 is a diagram for describing example pop-out photography performed by an information processing device according to an embodiment of the present disclosure.

More specifically, the setting unit 110 sets a depth segment based on a movement of the information processing device 100, and sets a portion of an image based on the user's operation performed on the information processing device 100 and a change in orientation of the information processing device 100. Thereafter, the display control unit 114 extracts a portion of the image corresponding to the set depth segment and a set portion of the image. A detailed description will be given with reference to FIG. 16, using example pop-out photography. FIG. 16 is a diagram for describing example pop-out photography performed by the information processing device 100 of the embodiment of the present disclosure.

The upper portion of FIG. 16 shows a conceptual diagram indicating a motion in the Z-axis direction of the information processing device 100 of FIG. 1. The middle portion of FIG. 16 shows the user's operation performed on the information processing device 100. The lower portion of FIG. 16 shows a conceptual diagram indicating a change in orientation of the information processing device 100, i.e., a rotational motion about the Y axis of the information processing device 100 of FIG. 1.

FIG. 16 shows an image 200 in which a person, a house, and a mountain have been captured as subjects. An example in which a portion of the image 200 is extracted based on a motion of the information processing device 100 and the user's operation performed on the information processing device 100, will now be described.

Initially, when the user 20 moves the information processing device 100 to a location D4 in the Z-axis direction, the motion detection unit 106 detects a movement of the information processing device 100 in the positive direction of the Z axis. Next, the setting unit 110 sets, as a depth segment, a depth portion corresponding to the amount of the movement of from O to D4 in the positive direction of the Z axis obtained from the motion detection unit 106. Thereafter, the display control unit 114 causes a portion of the image 200 having a depth corresponding to the depth segment set by the setting unit 110 to be in the selected state. As a result, in response to the movement of the information processing device 100 in the positive direction of the Z axis, as shown in the second figure from the left of FIG. 16 the person in the image 200 is caused to be in the selected state.

Next, when the user 20 performs a touch operation on the touchscreen and then a drag operation diagonally from the touch location, the operation detection unit 104 detects the touch operation and drag operation performed on the information processing device 100. Next, based on the touch operation and drag operation obtained from the operation detection unit 104, the setting unit 110 calculates a rectangle having a diagonal line extending from the touch location to another touch location during the drag operation or a location where the drag operation has been ended, and sets the calculated rectangular portion of the image 200 as a portion to be extracted. Thereafter, the display control unit 114 causes the set portion of the image 200 to be in the selected state while maintaining, in the selected state, the portion of the image 200 having a depth corresponding to the depth segment set by the setting unit 110. As a result, in response to the touch operation and drag operation performed on the information processing device 100, as shown in the middle figure of FIG. 16 a background including a portion of the house as well as the person in the image 200 are caused to be in the selected state.

Next, when the user 20 slants the information processing device 100 in a right rear direction toward the image 200, the motion detection unit 106 detects a counterclockwise change in orientation about the Y axis of the information processing device 100. Next, the setting unit 110 virtually slants the selected rectangle in a clockwise rotational direction about the Y axis, opposite to the rotational direction causing the orientation change obtained from the motion detection unit 106, and sets the slanting shape as a portion of the image 200 to be extracted instead of the original rectangle, i.e., changes the setting of the original rectangle. Thereafter, the display control unit 114 causes the portion of the image 200 having the changed setting to be in the selected state while maintaining, in the selected state, the portion of the image 200 having a depth corresponding to the depth segment set by the setting unit 110. As a result, in response to the counterclockwise change in orientation about the Y axis of the information processing device 100, as shown in the second figure from the right of FIG. 16, the rectangle originally selected is changed to a trapezoid while the person in the image 200 is maintained in the selected state.

Next, the user 20 performs an input operation etc. on the information processing device 100 to determine a portion of the image 200 to be extracted, in response to this the operation detection unit 104 detects the user's operation performed on the information processing device 100. If the operation detection unit 104 detects the operation, the display control unit 114 extracts the selected portion of the image 200, i.e., the portion of the image 200 corresponding to the set depth segment and the set portion of the image 200, and displays only the extracted portions of the image 200. As a result, in response to the user's operation performed on the information processing device 100, as shown in the right figure of FIG. 16 only the selected trapezoidal portion of the image 200 including a portion of the person and house is displayed.

Figure 17:
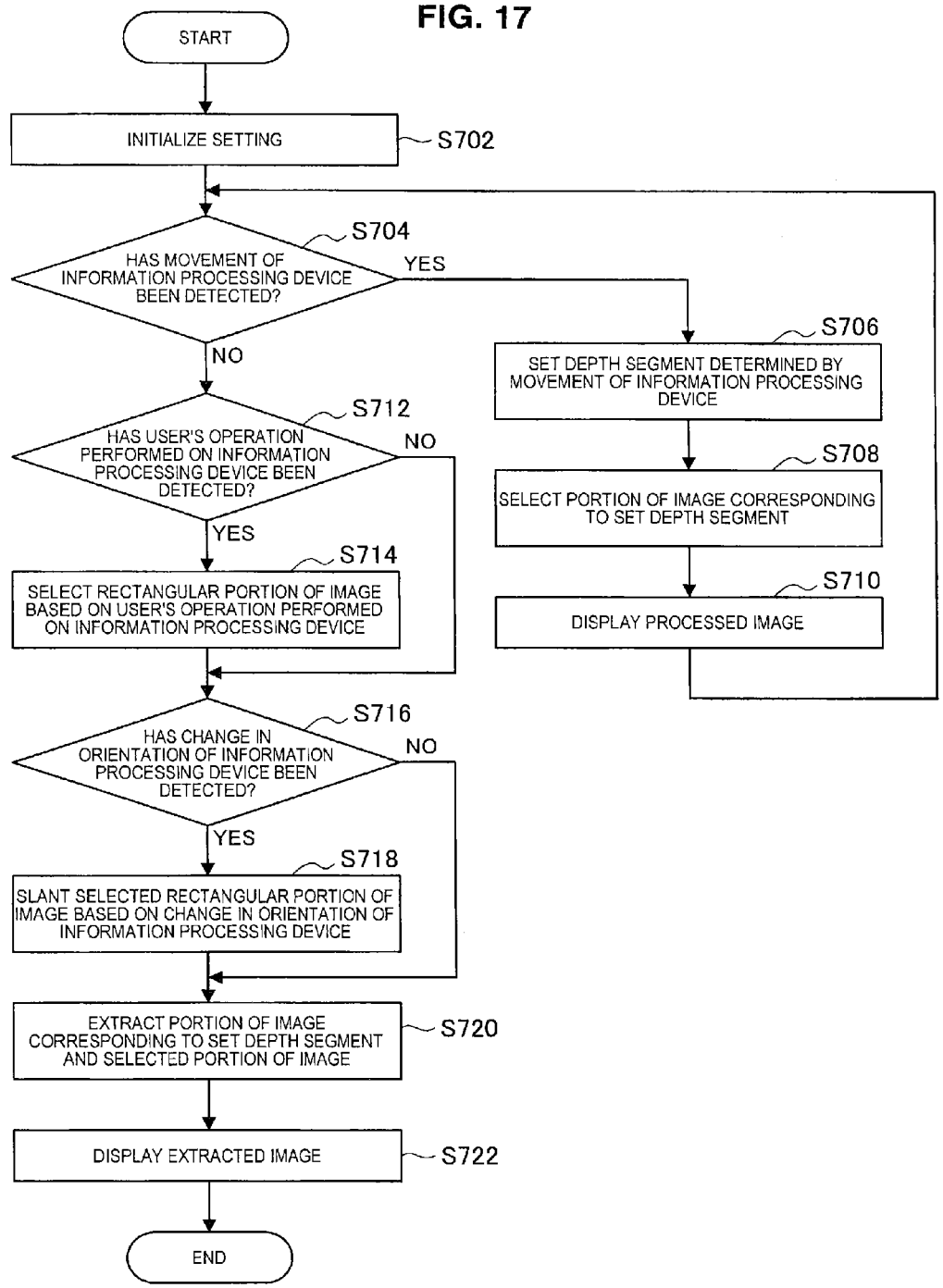
FIG. 17 is a flowchart showing the concept of a pop-out photography process performed by an information processing device according to an embodiment of the present disclosure.

Next, the pop-out photography process performed by the information processing device 100 of the embodiment of the present disclosure will be described with reference to FIG. 17. FIG. 17 is a flowchart showing the concept of the pop-out photography process performed by the information processing device 100 of the embodiment of the present disclosure.

Initially, the setting unit 110 initializes the settings of a depth segment and a portion of an image to be extracted (step S702).

Next, the motion detection unit 106 determines whether or not a movement of the information processing device 100 has been detected (step S704). Specifically, the motion detection unit 106 obtains information about a change in the location from a sensor etc. to determine whether or not a change in location of the information processing device 100 has been changed.

If, in step S704, it is determined that a movement of the information processing device 100 has been detected, the setting unit 110 sets a depth segment which is determined based on the movement of the information processing device 100 (step S706). Specifically, the setting unit 110 sets, as a depth segment, a depth portion corresponding to the amount of the movement detected by the motion detection unit 106.

Next, the display control unit 114 causes a portion of the image corresponding to the depth segment set by the setting unit 110 to be in the selected state (step S708). Specifically, the display control unit 114 causes a portion of the image having a depth included in the set depth segment to be in the selected state.

Next, the display unit 116 displays an image a portion of which has been caused by the display control unit 114 to be in the selected state (step S710). After the image is displayed by the display unit 116, control returns to step S704.

If, in step S704, it is determined that a movement of the information processing device 100 has not been detected, the operation detection unit 104 determines whether or not the user's operation performed on the information processing device 100 has been detected (step S712). Specifically, the operation detection unit 104 obtains information about a detected operation from a sensor etc. to determine whether or not the user's operation performed on the information processing device 100 has been detected.

If, in step S712, it is determined that the user's operation performed on the information processing device 100 has been detected, the setting unit 110 sets a rectangular portion of the image based on the user's operation performed on the information processing device 100 (step S714). Specifically, the setting unit 110 sets, as a portion to be selected, a rectangle having a diagonal line extending between a touch location and a drag end location which have been detected by the operation detection unit 104.

If, in step S712, it is determined that the user's operation performed on the information processing device 100 has not been detected, control proceeds to step S716.

Next, the motion detection unit 106 determines whether or not a change in orientation of the information processing device 100 has been detected (step S716). Specifically, the motion detection unit 106 obtains information about a change in the slant from a sensor etc. to determine whether or not a change in orientation of the information processing device 100 has been detected.

If, in step S716, it is determined that a change in orientation of the information processing device 100 has been detected, the setting unit 110 slants the selected rectangular portion of the image based on the orientation change of the information processing device 100 (step S718). Specifically, the setting unit 110 virtually slants the selected rectangle in a rotational direction opposite to the rotational direction causing the orientation change detected by the motion detection unit 106, and sets the slanting shape as a portion of the image to be extracted instead of the original rectangle.

If, in step S716, it is determined that a change in orientation of the information processing device 100 has not been detected, control proceeds to step S720.

Next, the display control unit 114 extracts a portion of the image corresponding to the depth segment set by the setting unit 110 and the selected portion of the image (step S720). Specifically, the display control unit 114 extracts a portion of the image corresponding to any of a portion of the image having a depth included in the depth segment set by the setting unit 110 and the selected portion of the image.

Next, the display unit 116 displays the portion of the image extracted by the display control unit 114 (step S722).

Thus, the information processing device 100 sets a depth segment to be extracted from an image based on a movement of the information processing device 100, and sets a portion of the image to be extracted which is not included in the depth segment based on a change in orientation of the information processing device 100 and the user's operation performed on the information processing device 100. Thereafter, the information processing device 100 extracts the set portions of the image. Therefore, by setting a portion of an image to be extracted based on a motion of the information processing device 100 and the user's operation performed on the information processing device 100, the user can intuitively perform pop-out photography.

6-6. Example Change Over Time in Segmentation

In the segmentation performed by the information processing device 100 of this embodiment, a portion of an image to be extracted may be changed over time. Specifically, the setting unit 110 changes the setting of a depth segment over time, and the display control unit 114 changes an image to be extracted based on the change of the depth segment set by the setting unit 110.

More specifically, the setting unit 110 stores depth segments set based on movements of the information processing device 100, and reads and sets the stored depth segments sequentially in time. Thereafter, the display control unit 114 sequentially extracts portions of the image based on changes in the depth segment set sequentially in time by the setting unit 110. Thereafter, the display unit 116 sequentially displays the images extracted by the display control unit 114.

Thus, the information processing device 100 stores changes in a set depth segment based on movements of the information processing device 100, reads and sets the stored depth segments sequentially in time, and changes portions of the image to be extracted based on the depth segments set sequentially. Therefore, by reading and setting the stored depth segments sequentially in time, a moving image can be generated in which extracted portions of an image are changed over time.

6-7. Example Automatic Process of Segmentation

The segmentation performed by the information processing device 100 of this embodiment may be automatically performed in accordance with a program. Specifically, the information processing device 100 sets a depth segment to be extracted in accordance with a program, and extracts a portion of an image based on the set depth segment. More specifically, the setting unit 110 changes a set depth segment in accordance with a program stored in the storage unit 112, and the display control unit 114 extracts a portion of an image corresponding to the depth segment set by the setting unit 110.

Thus, the information processing device 100 sets a depth segment to be extracted in accordance with a program, and extracts a portion of an image corresponding to the set depth segment. Therefore, a depth segment is set by a program, whereby a portion of an image can be accurately extracted in accordance with a predetermined rule.

7. Hardware Configuration

An embodiment of the present disclosure has been described above. The above process performed by the information processing device 100 is achieved by cooperation of software and the following hardware of the information processing device 100.

Figure 18:
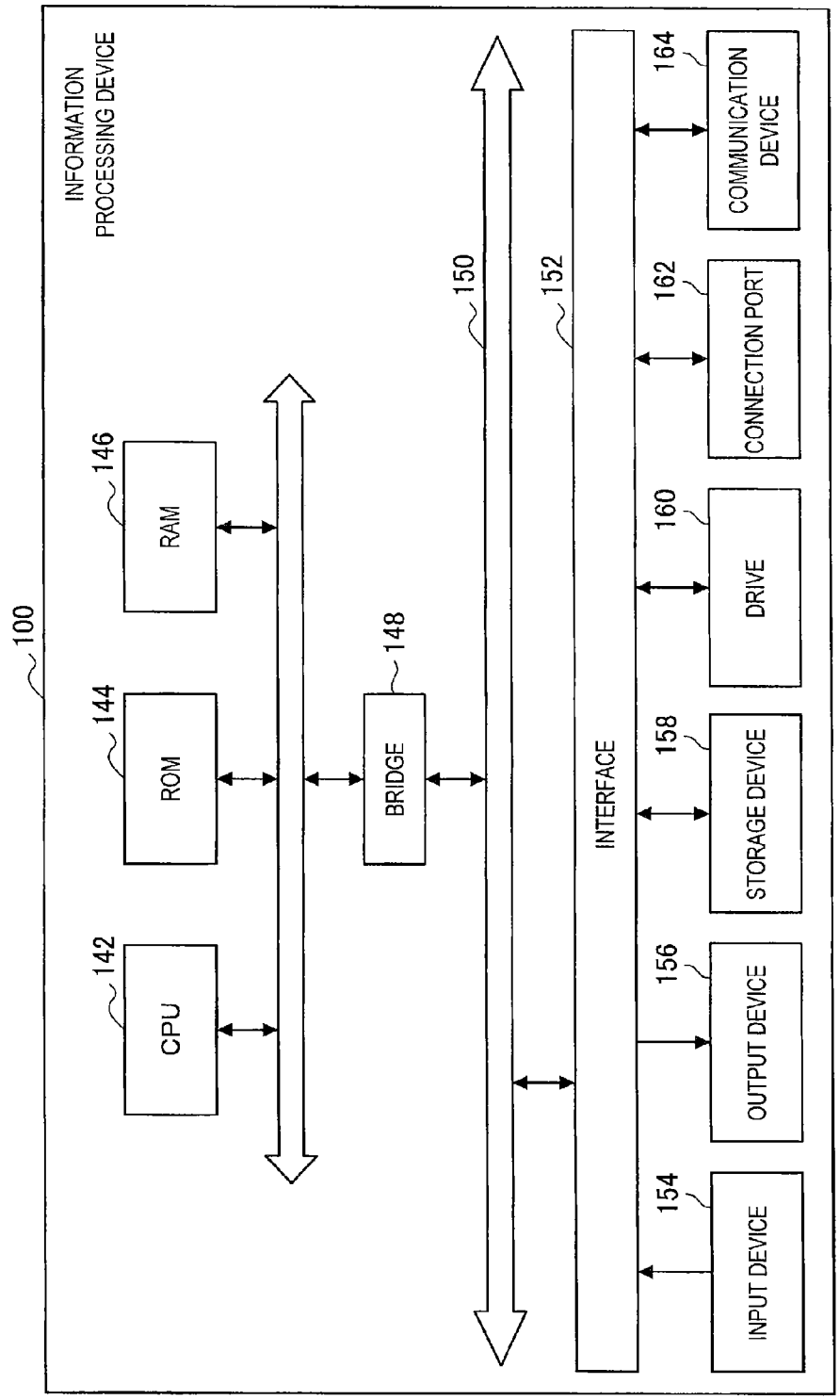
FIG. 18 is a diagram showing a hardware configuration of an information processing device according to an embodiment of the present disclosure.

FIG. 18 is a diagram showing a hardware configuration of the information processing device 100 of the embodiment of the present disclosure. As shown in FIG. 18, the information processing device 100 includes a central processing unit (CPU) 142, a read only memory (ROM) 144, a random access memory (RAM) 146, a bridge 148, a bus 150, an interface 152, an input device 154, an output device 156, a storage device 158, a drive 160, a connection port 162, and a communication device 164.

The CPU 142 functions as a calculation processing device and a control device to implement the type-of-editing determination unit 108, the setting unit 110, and the display control unit 114 of the information processing device 100 in cooperation with various programs. The CPU 142 may be a microprocessor. The ROM 144 stores programs, calculation parameters, etc. which are used by the CPU 142. The RAM 146 temporarily stores programs used in execution by the CPU 901, parameters changed when necessary during the execution, etc. The ROM 144 and the RAM 146 are used to implement a portion of the storage unit 112 in the information processing device 100. The CPU 142, the ROM 144, and the RAM 146 are connected together by an internal bus including a CPU bus etc.

The input device 154 includes an input unit for allowing the user to input information, such as a mouse, keyboard, touchscreen, button, microphone, switch, lever, etc., the detection unit 102 including the operation detection unit 104 and the motion detection unit 106 of the information processing device 100, an input control circuit which generates an input signal based on the user's input and an input from the detection unit 102, and outputs the input signal to the CPU 142, etc. The user of the information processing device 100 can operate the input device 154 to input various items of data to the information processing device 100 or to instruct the information processing device 100 to perform a process operation.

The output device 156 may output to a display device, such as a liquid crystal display (LCD) device, an organic light emitting diode (OLED) device, a lamp, etc., which is an example of the display unit 116 of the information processing device 100. The output device 156 may also output an audio, such as a loudspeaker, a headphone, etc.

The storage device 158 is a device for storing data which is configured as an example of the storage unit 112 of the information processing device 100 of this embodiment. The storage device 158 may include a storage medium, a recording device which records data to the storage medium, a reading device which reads data from the storage medium, an erasure device which erases data from the storage medium, etc. The storage device 158 stores programs executed by the CPU 142 and various items of data.

The drive 160 is a reader/writer for a storage medium, and is internal or external to the information processing device 100. The drive 160 reads information from a removable storage medium mounted therein, such as a magnetic disk, optical disk, magneto-optical disk, semiconductor memory, etc., and outputs the information to the RAM 144. The drive 160 can also write information to the removable storage medium.

The connection port 162 is, for example, a bus for connecting to an information processing device or peripheral device external to the information processing device 100. The connection port 162 may be a universal serial bus (USB).

The communication device 164 is, for example, a communication interface including a communication device for connecting to a network etc., that is an example of the output unit 118 of the information processing device 100 of this embodiment. Alternatively, the communication device 164 may be a local area network (LAN)-compliant communication device, a long term evolution (LTE)-compliant communication device, or a wired communication device which performs communication via a wire.

8. Conclusion

According to the embodiment of the present disclosure, for an image having depth information, parameters for three-dimensional editing are set based on a motion of or an operation performed on the information processing device 100, whereby the three-dimensional editing can be intuitively performed.

It should be understood by those skilled in the art that various modifications, combinations, sub-combinations and alterations may occur depending on design requirements and other factors insofar as they are within the scope of the appended claims or the equivalents thereof.

The steps shown in the flowcharts of the above embodiment include steps which are performed in a time-series fashion in the stated order, and in addition, steps which may not be necessarily performed in a time-series fashion, i.e., may be performed in parallel or separately. Needless to say, steps which are performed in a time-series fashion may be optionally performed in different orders.

The advantages described herein are merely exemplary or illustrative, but not limiting. In addition to or instead of the above advantages, the technology of the present disclosure may achieve other advantages which will be apparent to those skilled in the art in light of the present disclosure.

Additionally, the present technology may also be configured as below.

(1) An information processing device including:
a detection unit configured to detect a motion of the information processing device;
a setting unit configured to set a location or orientation of a virtual light source for an image having depth information based on a result of the detection performed by the detection unit; and
a display control unit configured to apply an illumination effect to the image based on the location or orientation of the virtual light source set by the setting unit and the depth information.

(2) The information processing device according to (1), wherein
the detection unit further detects an operation performed on the information processing device, and
the setting unit sets an attribute of the virtual light source based on the result of the detection performed by the detection unit.

(3) The information processing device according to (1) or (2), wherein
the display control unit changes the illumination effect to be applied, based on a change in the setting.

(4) An information processing device including:
a detection unit configured to detect an operation performed on the information processing device and a movement of the information processing device;
a setting unit configured to set a flat-plane location based on an operation performed on the information processing device and a depth location based on a movement of the information processing device, for an image having depth information of each flat-plane location; and
a display control unit configured to superimpose, onto the image, a trajectory indicating changes in the flat-plane location and the depth location set by the setting unit.

(5) The information processing device according to (4), wherein
the depth location corresponds to the amount of a movement of the information processing device which falls within a range in which the hand of a user reaches.

(6) The information processing device according to (4) or (5), wherein
the display control unit changes the trajectory to be superimposed, based on changes in the flat-plane location and the depth location.

(7) The information processing device according to any one of (4) to (6), wherein
the setting unit changes the flat-plane location and the depth location which are set in accordance with a predetermined program.

(8) An information processing device including:
a detection unit configured to detect a movement of the information processing device which displays an image having depth information; and
an image extraction unit configured to extract a portion of the image corresponding to a depth segment which is determined based on the movement of the information processing device.

(9) The information processing device according to (8), wherein
the detection unit further detects an operation performed on or an orientation of the information processing device, and
the image extraction unit extracts a portion of the image based on the operation performed on or the orientation of the information processing device detected by the detection unit, and a portion of the image corresponding to the depth segment.

(10) The information processing device according to (8) or (9), wherein
the image extraction unit changes a portion of the image to be extracted, based on a change in the portion of the image corresponding to the depth segment.

(11) The information processing device according to any one of (8) to (10) wherein
the image extraction unit changes the portion of the image to be extracted, in accordance with a predetermined program.

What is claimed is:

1. An information processing device comprising:
circuitry configured to
detect a motion of the information processing device;
set a location and orientation of a virtual light source for an image having depth information based on a result of the detection;
apply an illumination effect to the image based on the location or orientation of the virtual light source set;
calculate a distance between the location of the virtual light source and the location in the depth direction of a portion of the image where an object is detected;
apply the illumination effect to the object such that portions of a surface of the object are illuminated with a variable intensity based on the calculated distance; and
apply a shadow effect associated with the detected object such that size and orientation characteristics of the shadow are proportionally based on the size of the object and on the calculated distance.

2. The information processing device according to claim 1, wherein the circuitry is further configured to:
detect an operation performed on the information processing device; and
set an attribute of the virtual light source based on the result of the detection performed.

3. The information processing device according to claim 2, wherein the circuitry is further configured to change the illumination effect to be applied, based on a change in the setting.

4. The information processing device according to claim 2, wherein
the attribute of the virtual light source is a level of intensity of the light, and wherein the level of intensity is configured based on a distance between the virtual light source and a detected object within the image.

5. The information processing device according to claim 1, wherein the circuitry is further configured to:
detect a plurality of objects within the image, each having an associated depth information; and
specify different reflection characteristics and different shadow characteristics for each object of the plurality of objects within the image based on the calculated distance between the virtual light source and a location in the depth direction associated with each plurality of objects.

6. The information processing device according to claim 5, wherein the circuitry is further configured to set the different reflection characteristics based on a measured distance between a new location of the virtual light source and each object of the plurality of objects within the image.

7. The information processing device according to claim 5, wherein the circuitry is further configured to set the different shadow characteristics based on a measured distance between a new location of the virtual light source and each object of the plurality of objects within the image.

8. The information processing device according to claim 5, wherein if a direction of the orientation change of the virtual light source is the same as a direction of the orientation change of the information processing device, an object of the plurality of objects is not illuminated.

9. The information processing device according to claim 1, wherein the circuitry is further configured to:
store an illumination setting of the virtual light source corresponding to a movement of the virtual light source over a predetermined time period, the movement corresponding to the detected motion of the information processing device; and
apply the illumination effect, sequentially in time, based on the stored illumination setting,
wherein a type of the virtual light source is simulated sun light.

10. A method comprising:
detecting, with circuitry, a motion of the information processing device;
setting, with the circuitry, a location and orientation of a virtual light source for an image having depth information based on a result of the detection;
applying, with the circuitry, an illumination effect to the image based on the location or orientation of the virtual light source set;
calculating, with the circuitry, a distance between the location of the virtual light source and the location in the depth direction of a portion of the image where an object is detected;
applying, with the circuitry, the illumination effect to the object such that portions of a surface of the object are illuminated with a variable intensity based on the calculated distance; and
applying, with the circuitry, a shadow effect associated with the detected object such that size and orientation characteristics of the shadow are proportionally based on the size of the object and on the calculated distance.

11. The method of claim 10, further comprising:
detecting an operation performed on the information processing device; and
setting an attribute of the virtual light source based on the result of the detection performed.

12. A non-transitory computer-readable storage medium including computer readable instructions thereon which when executed by a computer cause the computer to perform a method comprising:
   detecting a motion of the information processing device;
   setting a location and orientation of a virtual light source for an image having depth information based on a result of the detection;
   applying an illumination effect to the image based on the location or orientation of the virtual light source set;
   calculating a distance between the location of the virtual light source and the location in the depth direction of a portion of the image where an object is detected;
   applying the illumination effect to the object such that portions of a surface of the object are illuminated with a variable intensity based on the calculated distance; and
   applying a shadow effect associated with the detected object such that size and orientation characteristics of the shadow are proportionally based on the size of the object and on the calculated distance.

\* \* \* \* \*